United States Patent
Kim et al.

(10) Patent No.: US 12,287,983 B2
(45) Date of Patent: Apr. 29, 2025

(54) DATA SWAPPING METHOD AND ELECTRONIC DEVICE SUPPORTING SAME

(71) Applicant: SAMSUNG ELECTRONICS CO., LTD., Suwon-si (KR)

(72) Inventors: Chulmin Kim, Suwon-si (KR); Ohoon Kwon, Suwon-si (KR); Hyunjoon Cha, Suwon-si (KR); Jaewon Kim, Suwon-si (KR); Sooyong Suk, Suwon-si (KR); Yongtaek Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 63 days.

(21) Appl. No.: 18/082,966

(22) Filed: Dec. 16, 2022

(65) Prior Publication Data

US 2023/0118797 A1    Apr. 20, 2023

Related U.S. Application Data

(63) Continuation of application No. PCT/KR2021/006515, filed on May 25, 2021.

(30) Foreign Application Priority Data

Jun. 18, 2020    (KR) ......................... 10-2020-0074420

(51) Int. Cl.
*G06F 3/06* (2006.01)

(52) U.S. Cl.
CPC ............ *G06F 3/0653* (2013.01); *G06F 3/061* (2013.01); *G06F 3/0673* (2013.01)

(58) Field of Classification Search
CPC ......... G06F 3/061–0611; G06F 3/0647; G06F 3/0685; G06F 3/067; G06F 3/0653; G06F 3/0673; G06F 3/0683; G06F 3/0646; G06F 16/185; G06F 9/50; G06F 9/5016; G06F 2212/1024; G06F 2212/261;
(Continued)

(56) References Cited

U.S. PATENT DOCUMENTS 9,229,751 B2    1/2016  Yoo et al.
9,772,776 B2    9/2017  Tsirkin
(Continued)

FOREIGN PATENT DOCUMENTS

KR    10-2009-0109959 A    10/2009
KR    10-2012-0120651 A    11/2012
(Continued)

OTHER PUBLICATIONS

International Search Report (PCT/ISA/210) issued Aug. 31, 2021 by the International Searching Authority in International Application No. PCT/KR2021/006515.
(Continued)

*Primary Examiner* — Curtis James Kortman
(74) *Attorney, Agent, or Firm* — Sughrue Mion, PLLC

(57) ABSTRACT

An electronic device includes: a plurality of swap devices; a memory storing instructions and data to swap; and a processor configured to execute the instructions to: based on attributes of the data to swap stored in the memory and attributes of at least one swap device of the plurality of swap devices, identify a swap device for swapping the data among the plurality of swap devices, and swap the data using the identified swap device.

16 Claims, 12 Drawing Sheets

(58) Field of Classification Search
CPC ........... G06F 2212/657; G06F 12/0284; G06F 12/08; G06F 12/128; G06F 12/123; G06F 12/109; G06F 12/0868; G06F 12/126
See application file for complete search history.

(56) References Cited

U.S. PATENT DOCUMENTS

| | | | |
|---|---|---|---|
| 9,934,100 | B2 | 4/2018 | Lim et al. |
| 10,459,852 | B1* | 10/2019 | Michaud ............... G06F 13/161 |
| 10,545,871 | B2 | 1/2020 | Birke et al. |
| 10,831,392 | B2 | 11/2020 | Kim et al. |
| 2009/0265506 | A1 | 10/2009 | Mm |
| 2010/0241821 | A1 | 9/2010 | Barde et al. |
| 2014/0173227 | A1 | 6/2014 | Min et al. |
| 2015/0106582 | A1* | 4/2015 | Mai ......................... G06F 12/08 711/165 |
| 2015/0242121 | A1 | 8/2015 | Tsirkin |
| 2016/0018990 | A1 | 1/2016 | Yun et al. |
| 2016/0055097 | A1* | 2/2016 | Ki ....................... G06F 12/0871 711/160 |
| 2017/0090775 | A1* | 3/2017 | Kowles ................. G06F 3/0608 |
| 2019/0220217 | A1* | 7/2019 | Kimmel ................. G06F 3/0649 |
| 2019/0258420 | A1* | 8/2019 | Olderdissen .......... G06F 3/0604 |
| 2020/0348874 | A1* | 11/2020 | Iyer ..................... G06F 13/1668 |
| 2020/0409842 | A1 | 12/2020 | Roh |
| 2021/0019168 | A1* | 1/2021 | Aguilera ............... G06F 3/0607 |

FOREIGN PATENT DOCUMENTS

| | | |
|---|---|---|
| KR | 10-2014-0078390 A | 6/2014 |
| KR | 10-2016-0008885 A | 1/2016 |
| KR | 10-2016-0022226 A | 2/2016 |
| KR | 10-1602991 B1 | 3/2016 |
| KR | 10-2017-0092912 A | 8/2017 |
| KR | 10-1900569 B1 | 9/2018 |
| KR | 10-1907538 B1 | 10/2018 |
| KR | 10-2019-0048078 A | 5/2019 |

OTHER PUBLICATIONS

Written Opinion (PCT/ISA/237) issued Aug. 31, 2021 by the International Searching Authority in International Application No. PCT/KR2021/006515.

* cited by examiner

DATA SWAPPING METHOD AND ELECTRONIC DEVICE SUPPORTING SAME

CROSS-REFERENCE TO RELATED APPLICATIONS

This application is a by-pass continuation application of International Application No. PCT/KR2021/006515, filed on May 25, 2021, which is based on and claims priority to Korean Patent Application No. 10-2020-0074420, filed on Jun. 18, 2020, in the Korean Intellectual Property Office, the disclosure of which is incorporated by reference herein in its entirety.

BACKGROUND

1. Field

The disclosure relates to a data swap technique.

2. Description of Related Art

An electronic device (or a computing device) which performs data processing or operation may include a memory (e.g., a random access memory (RAM)) for storing data or instructions used by an executed application program. To more efficiently use a limited storage space of the memory, an operating system (OS) of the electronic device may provide more storage space than actual physical memory capacity by using a virtual memory. For example, the OS may set the memory and/or a part of the storage space of a storage medium embedded in the electronic device or connected and recognized outside as the virtual memory, and control access to the memory and/or the storage space of the storage medium set as the virtual memory through a virtual address (or a logical address).

Even though more storage space than the memory capacity is provided through the virtual memory, data should be actually stored in the memory in the data processing or operation and accordingly the OS may move the data into the memory, if the data is stored in the storage space of the storage medium, not the memory. In this case, the OS may use a data swapping (or memory swapping) method to move data between the memory and the storage medium. The data swapping may include a swap out process of moving some data of the data stored in the memory to the storage medium to temporarily store it in the storage medium, and a swap in process of moving data temporarily stored in the storage medium to the memory. The storage medium used for this data swapping may be referred to as a swap device, and the part of the storage space of the storage medium to which data is swapped may be referred to as a swap space.

The swap device uses a non-volatile storage device (e.g., a hard disk drive (HDD), a solid state drive (SSD), or a flash memory), but a memory or an external storage device in a network may also be used. If the memory is used as the swap device, some space of the memory may be set to the swap space.

As described above, a swap device may vary in type. However, a conventional electronic device generally uses one swap device. Alternatively, even if the conventional electronic device includes a plurality of various swap devices, a swap device for data swapping is selected from the plurality of the swap devices according to a priority set according to user setting or system setting or a free space size of a storage space. Accordingly, the conventional electronic device, which uses the plurality of the swap devices, may be slowed down in a data processing or operation speed.

SUMMARY

Provided are a data swapping method in consideration of attributes of data and attributes of each of swap devices, and an electronic device supporting the same.

According to an aspect of the disclosure, an electronic device includes: a plurality of swap devices; a memory storing instructions and data to swap; and a processor configured to execute the instructions to: based on attributes of the data to swap stored in the memory and attributes of at least one swap device of the plurality of swap devices, identify a swap device for swapping the data among the plurality of swap devices, and swap the data using the identified swap device.

The attributes of the data include at least one of whether the data is related to a user interface, an execution frequency of the data, erasability of the data, a memory range accessed per unit time in execution of the data, or integrity of the data in swapping.

The attributes of the at least one swap device include at least one of a swap device performance, a swap device lifespan, access availability to the swap device, or data integrity in swapping using the swap device.

The processor may be further configured to execute the instructions to: based on attributes of each of a plurality of data stored in the memory, classify the plurality of data into groups, and identify swap devices, among the plurality of swap devices, respectively corresponding to the groups.

The processor may be further configured to execute the instructions to: identify at least a portion of data included in each of the groups as a swapping target, based on data usage history information corresponding to each of the groups, and swap the identified at least the portion of the data using a swap device corresponding to each of the groups.

The processor may be further configured to execute the instructions to: generate association information between the attributes of the data and the attributes of the at least one swap device, and identify a swap device for swapping the data among the plurality of swap devices, based on the association information.

The association information may include information which sets at least one of swap device performance, a swap device lifespan, access availability to the swap device, or data integrity in swapping using the swap device among the attributes of the at least one swap device, based on at least one of whether the data is related to a user interface, an execution frequency of the data, erasability of the data, a memory range accessed per unit time in execution of the data, or integrity of the data in swapping among the attributes of the data.

The processor may be further configured to execute the instructions to identify the swap device for swapping the data among the plurality of swap devices, further based on state information of each of the plurality of swap devices, and the state information of each of the plurality of swap devices may include at least one of a swap device available space, a swap device free space, a data amount stored in the swap device, or a connection state of the swap device.

The processor may be further configured to execute the instructions to change a swap device for swapping the data among the plurality of swap devices, based on a swapping overhead value of each of the plurality of swap devices with respect to the data.

The processor may be further configured to execute the instructions to change a swap device for swapping the data among the plurality of swap devices, based on a system performance improvement value according to securing a memory space for each of the plurality of swap devices and a swapping overhead value of each of the plurality of swap devices.

According to an aspect of the disclosure, a data swapping method for an electronic device, includes: identifying a swap device for swapping data among a plurality of swap devices, based on attributes of the data to swap stored in a memory included in the electronic device and attributes of at least one swap device among the plurality of swap devices included in the electronic device; and swapping the data using the identified swap device.

The data swapping method may further include: classifying a plurality of data into groups, based on attributes of each of the plurality of data stored in the memory; identifying swap devices, among the plurality of swap devices, respectively corresponding to the groups; identifying, as a swapping target, at least a portion of data of data included in each of the groups, based on data usage history information corresponding to each of the groups; and swapping the identified at least the portion of data using the swap device corresponding to each of the groups.

The data swapping method may further include: generating association information between the attributes of the data and the attributes of the at least one swap device, the identifying the swap device may include: identifying the swap device for swapping the data from among the plurality of swap devices, based on the association information, and the generating the association information may include setting information of at least one of swap device performance, a swap device lifespan, access availability to the swap device, or data integrity in swapping using the swap device among the attributes of the at least one swap device, based on at least one of whether the data is related to a user interface, an execution frequency of the data, erasability of the data, a memory range accessed per unit time in execution of the data, or integrity of the data in swapping among the attributes of the data.

The data swapping method may further include changing a swap device for swapping the data among the plurality of swap devices, based on a swapping overhead value of each of the plurality of swap devices with respect to the data.

The data swapping method may further include changing a swap device for swapping the data among the plurality of swap devices, based on a system performance improvement value according to securing a memory space for each of the plurality of swap devices and a swapping overhead value of each of the plurality of swap devices.

According to various embodiments of the present disclosure, by swapping data in consideration of attributes of data and attributes of each of swap devices, data processing or operation may speed up, and system performance may be improved.

In addition, various effects directly or indirectly obtained through the present disclosure may be provided.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
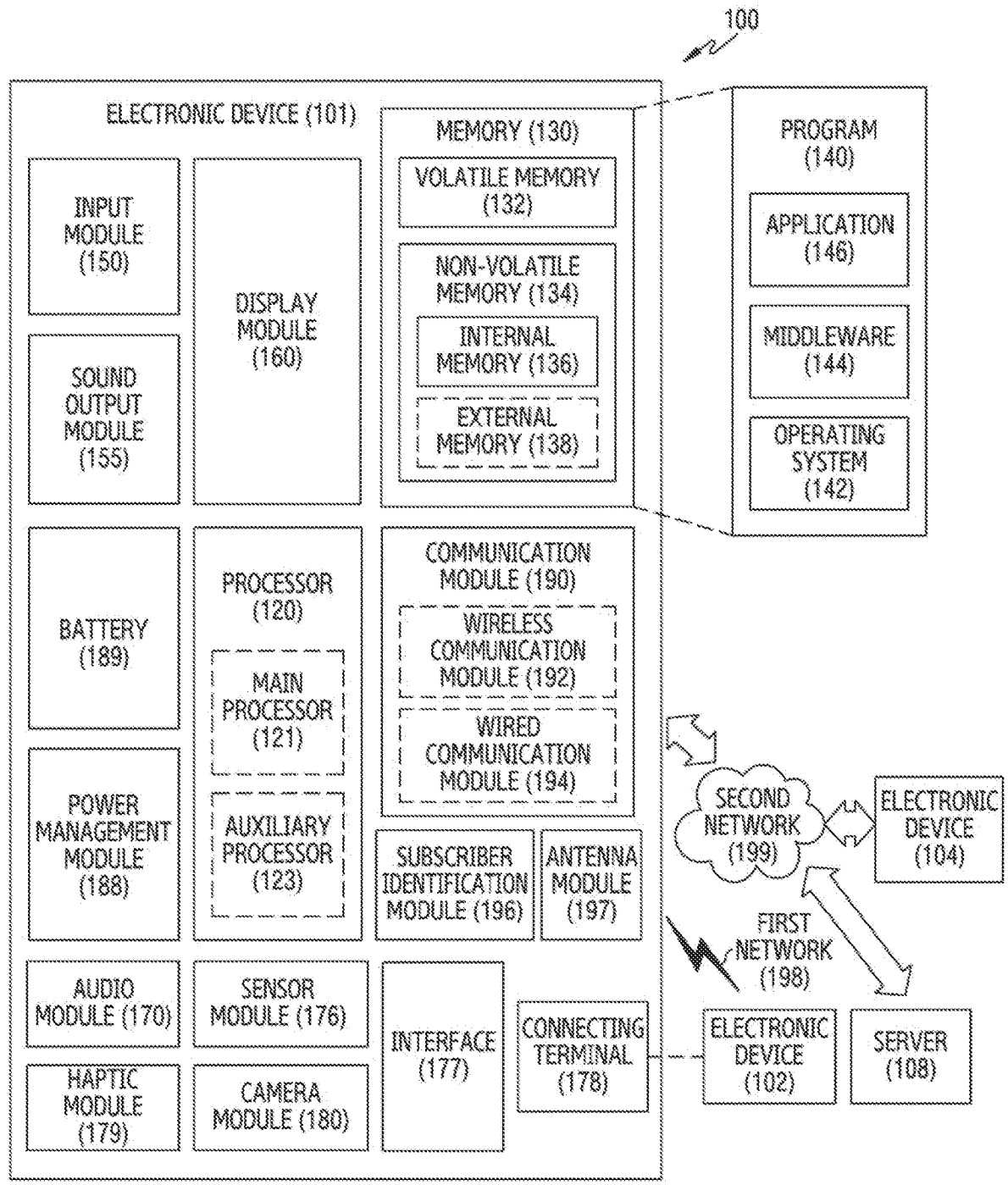
FIG. 1 is a block diagram of an electronic device in a network environment according to various embodiments.

Hereinafter, various embodiments of the present disclosure will be described with reference to the accompanying drawings. Components shown in the drawings may be exaggerated or reduced in size for convenience of description, and the present disclosure is not necessarily limited to the illustrated ones.

In the drawings, identical or similar reference numerals may be used for identical or similar components.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
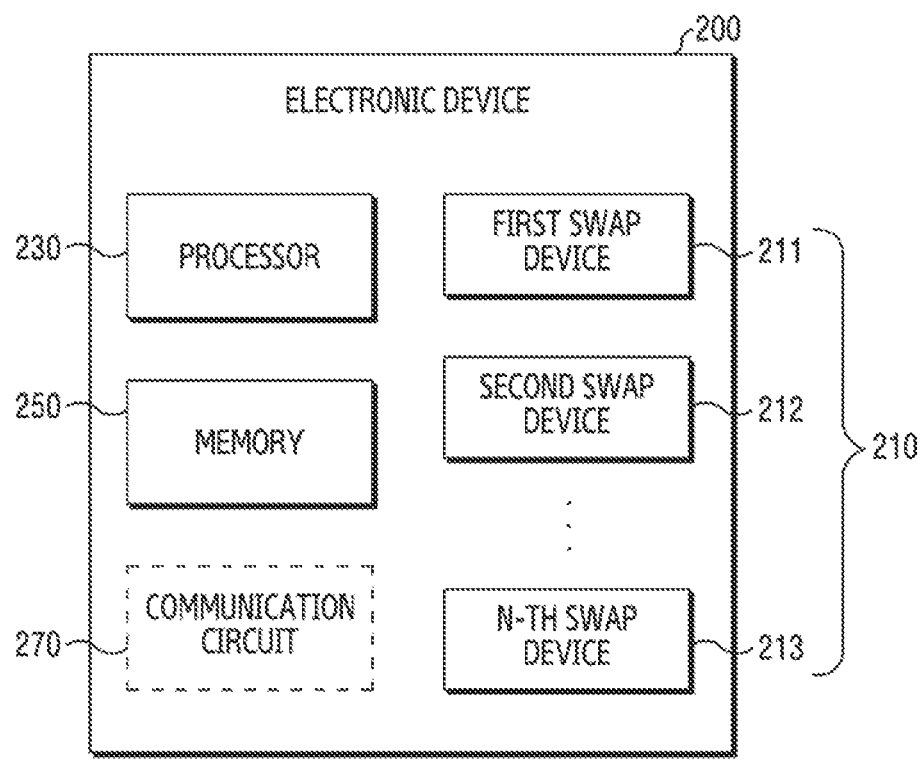
FIG. 2 is a diagram for explaining a configuration of an electronic device related to data swapping according to an embodiment of the present disclosure.

FIG. 2 is a diagram for explaining a configuration of an electronic device related to data swapping according to an embodiment of the present disclosure.

Referring to FIG. 2, an electronic device 200 (e.g., the electronic device 101 of FIG. 1) may provide a data swapping (or memory swapping) method in consideration of data attributes using a plurality of swap devices 210 (e.g., the memory 130, or an external storage device connected through the communication module 190 and/or the connection terminal 178 of FIG. 1). For example, if swapping some of data stored in a memory 250 (e.g., a random access memory (RAM)) (e.g., the volatile memory 132 of FIG. 1) to the swap device 210, a processor 230 of the electronic device 200 may determine the swap device 210 for swapping the data, based on attributes of the data to swap and attributes of the swap device 210, and swap the data using the determined swap device 210. Herein, the data may include data used by a process or an application program executed by the processor 230. According to an embodiment, the data may be processed based on a designated size (e.g., 4 kb). Unit data having the designated size may be referred to as a page. That is, the data may be processed on the page basis if allocated to the memory 250, released from the memory 250, or assigned attributes.

To perform the above-described function, the electronic device 200 may include the plurality of swap devices 210, the processor 230 (e.g., the processor 120 of FIG. 1), and the memory 250 (e.g., the memory 130 of FIG. 1). However, the configuration of the electronic device 200 is not limited thereto. According to various embodiments, the electronic device 200 may further include at least one other component than the above-mentioned components. As an example, the electronic device 200 may further include a communication circuit 270 for communicating with an external electronic device.

The plurality of swap devices 210 may represent virtual devices in which a part of a storage space of a storage medium embedded in the electronic device 200 or connected and recognized from outside is set as a swap space. According to an embodiment, at least one of the plurality of the swap devices 210 may include a virtual device in which a part of a storage space of a non-volatile storage device (e.g., a hard disk drive (HDD), a solid state drive (SSD), or a flash memory) (e.g., the non-volatile memory 134 of FIG. 1) embedded in the electronic device 200 or connected and recognized from outside is set to the swap space. According to another embodiment, at least one of the plurality of the swap devices 210 may include a virtual device in which a part of the storage space of the memory 250 (e.g., a RAM) (e.g., the volatile memory 132 of FIG. 1) is set to the swap space. In yet another embodiment, at least one of the plurality of the swap devices 210 may include a virtual device in which a part of a storage space of an external storage device in a network is set to the swap space. In this case, the processor 230 may communicate with the external storage device through the communication circuit 270 to transmit and receive data. FIG. 2 depicts that a first swap device 211, a second swap device 212 and an n-th swap device 213 are included as the plurality of the swap devices 210. Herein, n denotes 0 or a natural number, indicating that the electronic device 200 includes at least two or more swap devices 210.

According to an embodiment, the swap space may be a virtual memory. The swap space may be a method of providing a greater memory area than an actual main memory device (e.g., the memory 250), as one of methods for managing the memory 250. A virtual address or a logical address may be used to use the swap space, and the virtual address or the logical address may be translated to a real address by a memory management unit (MMU).

According to an embodiment, the plurality of the swap devices 210 may be statically or dynamically generated (or recognized) by the processor 230 (e.g., according to an operation of the operating system 142 or a boot loader). For example, at least one of the plurality of the swap devices 210 may be statically generated (or recognized) by the processor 230 if the electronic device 200 is booted. As another example, at least one of the plurality of the swap devices 210 may be generated (or recognized) dynamically by the processor 230 if a storage medium providing the swap space is newly connected to the electronic device 200 or if the system requests at a designated time.

According to an embodiment, if the swap space is created, that is, if the plurality of the swap devices 210 is generated (or recognized), attributes (e.g., hardware properties) of each of the plurality of the swap devices 210 may be set. For example, the processor 230 may set attributes of each of the plurality of the swap devices 210 based on preset values stored in the memory. As another example, the processor 230 may set attributes of each of the plurality of the swap devices 210 according to a series of evaluation processes.

The attributes of each of the plurality of the swap devices 210 may include, for example, at least one of performance, lifespan, access availability, or data integrity. The performance may be determined by at least one of data processing latency or a communication bandwidth. Since the lifespan of a NOT AND (NAND)-type storage medium reduces according to a data writing (or storing) count, the lifespan may include information which quantifies the lifespan reduction. The access availability may indicate whether access to the swap device 210 is available. For example, if the swap device 210 is set using a part of the storage space of the external storage device in the network (the network swap method) and the network access is not available, the access to the swap device 210 is not available and accordingly the access availability may be determined according to the network connection availability. The data integrity may be determined according to whether consistency is maintained between data moved from the memory 250 to the swap device 210 (e.g., swap out data) and data moved from the swap device 210 to the memory 250 (e.g., swap in data) if the data is swapped using the swap device 210. For example, in a lossy compression scheme of data compression swap schemes which sets and uses the part of the storage space of the memory 250 as the swap device 210, some of data may be lossy during data compression and accordingly the integrity may not be ensured.

According to an embodiment, the processor 230 may set attributes of at least some of the plurality of the swap devices 210 according to an evaluation process. For example, the evaluation process may include at least a part of 1) a performance evaluation process, 2) a lifespan evaluation process, 3) an access availability evaluation process, and 4) data integrity evaluation process. The performance evaluation process included in the evaluation process may be, for example, a process in which the processor 230 conducts a unit test on the swap device 210 to identify the performance of the swap device 210. For example, the processor 230 may request synchronous input/output such as read/write from the swap device 210, measure a turnaround time, and thus identify data processing latency. The lifespan evaluation process included in the evaluation process may be, for example, a process in which the processor 230 acquires a device lifetime value which is a common standard provided by the swap device 210, and thus identifies the lifespan of the swap device 210. The access availability evaluation process included in the evaluation process may be, for example, a process in which the processor 230 determines whether the swap device 210 uses the network, identifies the network connection availability, and thus identifies whether the access to the swap device 210 is available. The data integrity evaluation process included in the evaluation process may be, for example, a process in which the processor 230 identifies whether the swap device 210 is a swap device which uses the lossy compression scheme among the data compression swap schemes, and thus identifies whether the data integrity is maintained during the data swapping using the swap device 210.

The following Table 1 shows the attributes of the swap device according to the swap device type. The attributes of the swap device based on the swap device type included in Table 1 are exemplary, and the swap device types used in the present disclosure or the attributes of the swap device based on the swap device type are not limited thereto.

TABLE 1

| Swap devices | Performance | Lifespan | Access availability | Data integrity |
|---|---|---|---|---|
| Hard disk drive | Mid | Long | High | Ensured |
| Flash memory | Mid | Short | High | Ensured |
| RAM (compression scheme) | High | Long | High | Ensured |
| RAM (lossy compression scheme) | High | Long | High | Not ensured |
| External storage device in the network (network swap method) | Low | Long | Low | Ensured |

According to an embodiment, the attributes of each of the plurality of the swap devices 210 may be set to preset value as shown in Table 1 according to the type of each of the plurality of the swap devices 210. For example, if the swap device 210 is set as the hard disk drive or a part of a storage space of the hard disk drive, the processor 230 may set the attributes of the swap device 210 to values indicating mid performance, long lifespan, high access availability, and data integrity ensured. As another example, if the swap device 210 is set to the flash memory or a part of a storage space of the flash memory, the processor 230 may set the attributes of the swap device 210 to values indicating mid performance, short lifespan, high access availability and data integrity ensured. As yet another example, if the swap device 210 is set to the RAM or a part of the RAM storage space and uses the lossless compression scheme, the processor 230 may set the attributes of the swap device 210 to values indicating high performance, long lifespan, high access availability and data integrity ensured. As still another example, if the swap device 210 is set to the RAM or a part of the RAM storage space and uses the lossy compression scheme, the processor 230 may set the attributes of the swap device 210 to values indicating high performance, long lifespan, high access availability and no data integrity. As a further example, if the swap device 210 is set to the external storage device in the network or a part of a storage space of the external storage device in the network, the processor 230 may set the attributes of the swap device 210 to values indicating low performance, long lifespan, low access availability, and data integrity ensured.

The processor 230 may control at least one other component of the electronic device 200 and perform various data processing or operations. According to an embodiment, the processor 230 may generate and execute a process for performing a designated function based on system setting or a user input. The process may refer to a program and data loaded into a main memory device (e.g., the memory 250) while the program for performing the designated function is executed. The processor 230 may determine the swap device 210 for swapping the data among the plurality of the swap devices 210, based on the attributes of the data to swap in the data stored in the memory 250 and the attributes of each of the plurality of the swap devices 210. In this regard, the processor 230 may determine the attributes of the data. Herein, the data includes data used by a process executed by the processor 230 or an application program (e.g., the application 146 of FIG. 1), and may include at least one page of pages related to the process. For example, in the following description, the data to swap may include a page of the process, and the data attributes may include attributes of the process.

The attributes of the data may include, for example, at least one of whether a user interface (UI) is related, an execution frequency, erasability, a memory range accessed per unit time, or data integrity. Whether the UI is related may indicate whether the data is related to a UI processing operation. The UI processing operation may include, for example, generating and outputting (or displaying) the UI, or processing a user input on the UI. The execution frequency may indicate an execution frequency of the data. For example, the execution frequency may be determined according to the number of accesses of the processor 230 to the memory 250 to use the data. The erasability may indicate whether the system may delete the data if necessary. For example, the erasability may indicate whether a specific process, which is forcibly terminated (data is deleted) during the execution, does not affect other process execution or the system. The memory range is a concept identical or similar to a working set size, and may indicate a range of the memory accessed by the process during the actual operation. The data integrity may indicate whether data consistency is maintained in the data swapping. For example, the data integrity may be determined according to data integrity between data (e.g., swap out data) moved from the memory 250 to the swap device 210 and data (e.g., swap in data) moved from the swap device 210 to the memory 250, if the data is swapped using the swap device 210.

According to an embodiment, the processor 230 may classify (or divide) the data into groups (or classes) according to the attributes of the data. For example, the processor 230 may classify data of the same or similar attributes into one group. For example, the processor 230 may classify pages of the same process into one group. As another example, the processor 230 may classify pages of processes having the same or similar attributes into one group. If a plurality of data is classified into a plurality of groups according to the attributes each of the plurality of the data, the plurality of the groups each may have a representative attribute. For example, the processor 230 may set the attributes of each of the plurality of the groups based on the data attributes included in the plurality of the groups. Alternatively, the processor 230 may set attributes of each of the plurality of the groups, and classify the plurality of the data according to the set attributes of the groups. In this regard, the attribute of each of the plurality of the groups may include the same type as the data attribute. For example, the attributes of each of the plurality of the groups may include at least one of whether the UI is related, the execution frequency, the erasability, the memory range accessed per unit time, or the data integrity with respect to the data included in each of the plurality of the groups According to an embodiment, the processor 230 may compare the data attributes with the attributes of each of the plurality of the groups, and apply load balancing, if there is a plurality of groups having the identical attributes or attribute similarity over a designated size. For example, the processor 230 may determine a group to include the data based on a data amount (or the number of processes) included in the plurality of the groups. For example, the processor 230 may include (classify) the data into a group having a small data amount (or the number of the processes) included in the plurality of the groups.

According to an embodiment, the processor 230 may generate a designated number of groups at a system start time, for example, at a time at which the electronic device 200 is turned on. In another embodiment, the processor 230 may further generate a new group at an arbitrary timing during a runtime or change the attribute of at least one of the generated groups.

According to an embodiment, the processor 230 may classify groups with respect the generated data (or process), at the data generation (or the process generation). In some embodiment, the processor 230 may change (or reassign) the data (or the process) to another group, according to data execution (or process execution) during the runtime.

According to an embodiment, the processor 230 may determine data to swap in the data stored in the memory 250 based on data usage history information. For example, the processor 230 may determine, as the swapping target, data having a low execution frequency (or the number of uses) or the oldest last execution (or use) among the data stored in the memory 250. For example, the processor 230 may determine a page to swap among pages stored in the memory 250, based on a page least recently used (LRU) list. According to an embodiment, if a plurality of data (or process pages) is classified into a plurality of groups, the processor 230 may determine data (or a process page) to swap based on data usage history information (e.g., the page LRU list) corresponding to each of the plurality of the groups.

According to an embodiment, the processor 230 may generate (or recognize) the plurality of the swap devices 210, and set attributes (e.g., hardware properties) of each of the plurality of the swap devices 210. The attributes of each of the plurality of the swap devices 210 may include, for example, at least one of the performance, the lifespan, the access availability, or the data integrity.

According to an embodiment, the processor 230 may determine the swap device for swapping data among the plurality of the swap devices 210, based on the attributes of the data and the attributes of each of the plurality of the swap devices 210. For example, if the data is data related to the UI, the processor 230 may determine the swap device 210 having high performance (high performance) as the swap device 210 for swapping the data. As another example, if the data is data having a high execution frequency, the processor 230 may determine the swap device 210 having high performance as the swap device 210 for swapping the data. As yet another example, if the data is optionally erasable data, the processor 230 may determine the swap device 210 having high access availability and a long lifespan as the swap device 210 for swapping the data. As still another example, if the data is data of a wide memory range (e.g., a great memory range accessed per unit time), the processor 230 may determine the swap device 210 having high performance and a long lifespan as the swap device 210 for swapping the data. As a further example, if the data is data requiring the data integrity, the processor 230 may determine the swap device 210 ensuring the data integrity as the swap device 210 for swapping the data.

According to an embodiment, the processor 230 may determine the swap device 210 for swapping the data among the plurality of the swap devices 210, based on the attributes of the data and a type of each of the plurality of the swap devices 210. For example, since the attributes of each of the plurality of the swap devices 210 may be set to the preset values as shown in Table 1 according to the type of the swap device 210, the processor 230 may determine the swap device 210 for swapping the data based on the type of each of the plurality of the swap devices 210 and the attributes of the data.

The method of determining the swap device 210 for each data attribute has been described above, but the processor 230 may determine the swap device 210 based on at least one of the data attributes. For example, the processor 230 may determine the swap device 210 for swapping the data based on at least one of whether the UI is related, the execution frequency, the erasability, the memory range accessed per unit time, or the data integrity of the data attributes.

According to an embodiment, the processor 230 may determine the swap device 210 for swapping data included in the group among the plurality of the swap devices 210 based on attributes of the group to which the plurality of the data is classified based on their attributes. For example, if the group attributes include a UI-related attribute, the processor 230 may determine the swap device 210 having high performance as the swap device 210 for swapping data included in the group. As another example, if the group attributes include a high execution frequency attribute, the processor 230 may determine the swap device 210 having high performance as the swap device 210 for swapping data included in the group. As yet another example, if the group attributes include the optional erasability attribute, the processor 230 may determine the swap device 210 having high access availability and a long lifespan as the swap device 210 for swapping data included in the group. As still another example, if the group attributes group include a wide memory range attribute, the processor 230 may determine the swap device 210 having high performance and long lifespan to the swap device 210 for swapping data included in the group. As a further example, if the group attributes include the data integrity attribute, the processor 230 may determine the swap device 210 ensuring the data integrity to the swap device 210 for swapping the data included in the group.

As above, the method of determining the swap device 210 for each group attribute has been described, but the processor 230 may determine the swap device 210 based on at least one of the group attributes. For example, the processor 230 may determine the swap device 210 for swapping the data included in the group based on at least one of whether the UI is related, the execution frequency, the erasability, the memory range accessed per unit time, or the data integrity among the attributes of the group.

According to an embodiment, the processor 230 may determine the swap device 210 for swapping the data (or data included in the group), based on association information between the data attribute (or the group attribute) and the attribute of the swap device 210. The association information may indicate, for example, information of the attribute of the swap device 210 to consider according to the data attribute (or the group attribute). For example, whether the UI is related of the data attributes (or the group attributes) may be associated with the performance of the attributes of the swap device 210. As another example, the execution frequency of the data attributes (or the group attributes) may be associated with the performance of the attributes of the swap device 210. As yet another example, the optional erasability of the data attributes (or the group attributes) may be associated with the access availability and the lifespan of the attributes of the swap device 210. As still another example, the memory range of the data attributes (or the group attributes) may be associated with the performance and the lifespan of the attributes of the swap device 210. As a further example, the integrity of the data attributes (or the group attributes) may be associated with the integrity of the attributes of the swap device 210.

According to an embodiment, the processor 230 may determine an ideal swap device attribute to swap the data (or data included in the group) based on the association information. In addition, the processor 230 may determine the swap device 210 having the same attribute as the ideal swap device attribute as the swap device 210 for swapping the data (or data included in the group) among the plurality of the swap devices 210. In some embodiment, if there is no swap device 210 having the same attribute as the ideal swap device attribute among the plurality of the swap devices 210, the processor 230 may determine the swap device 210 having the most similar attribute to the ideal swap device attribute as the swap device 210 for swapping the data (or data included in the group) among the plurality of the swap devices 210.

According to an embodiment, based on the data attributes (or the group attributes) and the attributes of each of the plurality of the swap devices 210, if identifying two or more swap devices 210 for swapping the data (or data included in the group) among the plurality of the swap devices 210, the processor 230 may apply the load balancing. For example, if identifying the first swap device 211 and the second swap device 212 in the plurality of the swap devices 210, the processor 230 may select any one of the first swap device 211 and the second swap device 212 identified, based on at least one of a currently available space or free space, or a data amount currently stored in each of the first swap device 211 and the second swap device 212 identified. For example, the processor 230 may select a swap device storing relatively less data among the first swap device 211 and the second swap device 212 identified.

According to an embodiment, the processor 230 may determine the swap device 210 for swapping data based on a current state of the swap device 210. For example, if the swap device 210 lacks the currently available space or free space, stores considerable data, or is unavailable in connection, the processor 230 may determine another swap device 210. For example, even if the first swap device 211 is the most suitable swap device for swapping the data based on the attributes of the data and the attributes of the swap device 210 among the plurality of the swap devices 210, the processor 230 may determine the second swap device 212 of the plurality of the swap devices 210 as the swap device for swapping the data instead of the first swap device 211 by considering the current state of the first swap device 211. In this respect, the unavailable connection of the swap device 210 may include, for example, no recognition of the swap device 210 or no access due to network disconnection if the swap device 210 is set as the part of the storage space of the external storage device in the network.

According to an embodiment, the processor 230 may change (or redetermine) the swap device 210 (e.g., the first swap device 211) determined for swapping data (or data included in the group) to another swap device 210 (e.g., the second swap device 212). For example, the processor 230 may change the swap device 210 based on a swapping overhead value of the swap device 210 for the data (or data included in the group). As another example, the processor 230 may change (or determine) the swap device 210 based on a system performance improvement value according to the memory space secured by the plurality of the swap devices 210 (e.g., securing the memory space of the memory 250 by swapping data (or data included in the group) used by the executed process or application program) and a swapping overhead value. According to an embodiment, calculating at least one of the system performance improvement value and the swapping overhead value may be performed on a designated periodic basis during the runtime, and if at least one of the system performance improvement value or the swapping overhead value is calculated, the processor 230 may determine to change (or redetermine) the swap device 210 based on the calculated value.

According to an embodiment, if the swapping overhead value of the determined swap device 210 does not fall within a designated range, the processor 230 may change to another swap device 210. The designated range may indicate a range from a subtraction value to an addition value of a designated margin value based on a system average value. The swapping overhead value quantifies a processing load of the swap device 210 in the data swapping using the swap device 210, a lower swapping overhead value indicates less swapping load and a higher value indicates greater swapping load. The swapping overhead value may be calculated by the following Equation 1.

$$e_{loss} = \text{Slowdownabs}_{ca} = \text{SwapIn1}_{ca} * L_{sa} \qquad [\text{Equation 1}]$$

Herein, $e_{loss}$ (=Slowdownabs$_{ca}$) denotes a swapping overhead value of data (or data included in the group) "Ca", SwapIn1$_{ca}$ denotes a swap in count of the data (or the data included in the group) "Ca", and $L_{sa}$ denotes swap in latency of a swap device "Sa".

According to an embodiment, if the swapping overhead value is greater than the system average value by the margin value or more (exceeds a maximum value of the designated range), the processor 230 may change (or upgrade) the swap device 210 for swapping the data (or the data included in the group) to the swap device 210 having the low swapping overhead value. In another embodiment, if the swapping overhead value is smaller than the system average value by the margin value or more (falls below a minimum value of the designated range), the processor 230 may change (or downgrade) the swap device 210 for swapping the data (or the data included in the group) to the swap device 210 having the high swapping overhead value. In other case, the processor 230 may maintain the swap device 210 without changing it.

According to an embodiment, the processor 230 may change to the swap device 210 having the greatest value obtained by subtracting the swapping overhead value ($e_{loss}$ calculated by Equation 1) of each of the plurality of the swap devices 210 from the system performance improvement value ($e_{gain}$ calculated by Equation 2 below) according to securing the memory space for each of the plurality of the swap devices 210. The swapping overhead value of each of the plurality of the swap devices 210 may be calculated by Equation 1 described above. In addition, the system performance improvement value is a numerical value of how much system performance may be improved with the memory space secured by swapping the data (or the data included in the group). A higher system performance improvement value may indicate the system performance improvement, and a lower system performance improvement value may indicate system performance degradation. The system performance improvement value may be calculated by the following Equation 2.

$$e_{gain} = \text{MemorySaving} * a = \text{SwapUsed}_{ca} * (1-b) * a \quad \text{[Equation 2]}$$

Herein, $e_{gain}$ denotes the system performance improvement value in swapping the data (or data included in the group) "Ca" using the swap device 210, MemorySaving denotes the available memory capacity if swapping the data using the swap device 210, a denotes the system performance improvement per available memory unit capacity, $\text{SwapUsed}_{ca}$ denotes swap usage (e.g., data size) of the data (or data included in the group) "Ca", and b denotes the memory 250 overhead of the swap device 210.

The system performance improvement value (value a) per available memory unit capacity (e.g., 1 mb) is a tuning parameter which may be set by a system administrator (e.g., a user), and may be set to a heuristic value by estimating a purpose and a ratio for using the memory capacity additional obtained in the system. For example, since the memory storage space obtained through the swapping may be used as a cache for the storage (e.g., an HHD), data read from the storage may be reduced by the available memory capacity if the cache of the unit capacity is added, and thus the system performance may be improved. In this case, the system performance improvement value (value a) per available memory unit capacity may be set to a time difference value taken to read data of the unit capacity between the storage and the memory 250 (e.g., a difference value of a time taken to read data of 1 mb stored in the memory 250 and a time taken to read data of 1 mb stored in the memory 250). The memory 250 overhead (value b) of the swap device 210 may have the value 0 if the swap device 210 is set as the part of the storage space of the storage rather than the memory 250, and may have a value between 0 and 1 if the swap device 210 is set in the part of the storage space of the memory 250. For example, in the data compression swap scheme which sets and uses the part of the storage space of the memory 250 as the swap device 210, the memory 250 overhead (value b) of the swap device 210 may have a value about 0.3.

If determining the swap device 210 for swapping the data (or data included in the group), and selecting the data (or data included in the group) as the swapping target, the processor 230 may swap the data (or data included in the group) using the determined swap device 210. For example, the processor 230 may move (or swap out) the data stored in the memory 250 (or data included in the group) to the determined swap device 210. In addition, if re-executing the data (or data included in the group), the processor 230 may move (or swap in) the data (or data included in the group) temporarily stored in the determined swap device 210 to the memory 250.

In the above description, the method of determining the swap device 210 for swapping the data (or data included in the group) based on the data attributes and the attributes of the swap device 210 has been described, where determining the swap device 210 may indicate mapping the data (or the group) with the determined swap device 210. For example, first data (or a first group) having a first attribute may be mapped to the first swap device 211, and second data (or a second group) having a second attribute may be mapped to the second swap device 212. Hence, if determining the data to swap (e.g., the first data or the second data), the processor 230 may swap the data to swap using the swap device 210 (e.g., the first swap device 211 or the second swap device 212) mapped to the determined data. In so doing, mapping information between the data and the swap device 210 may be stored and managed in the memory 250.

The memory 250 may store various data used by at least one component of the electronic device 200. According to an embodiment, the memory 250 may store data or instructions used by a process or an application program executed by the processor 230.

The communication circuit 270 may support communication between the electronic device 200 and an external electronic device. For example, if at least one of the plurality of the swap devices 210 is configured by using a part of a storage space of an external storage device in a network, the electronic device 200 may transmit and receive data (swap data) to and from the external storage device through the communication circuit 270.

As mentioned above, according to various embodiments, an electronic device (e.g., the electronic device 101 or the electronic device 200) may include a plurality of swap devices (e.g., the swap device 210), a memory (e.g., the memory 130 or the memory 250), and a processor (e.g., the processor 120 or the processor 230), and the processor may be configured to, based on attributes of data to swap stored in the memory and attributes of at least one swap device of the plurality of the swap devices, determine a swap device for swapping the data among the swap devices, and swap the data using the determined swap device.

According to various embodiments, the attributes of the data may include at least one of whether the data is related to a user interface, an execution frequency of the data, erasability of the data, a memory range accessed per unit time in execution of the data, or integrity of the data in swapping.

According to various embodiments, the attributes of the at least one swap device may include at least one of a swap device performance, a swap device lifespan, access availability to the swap device, or data integrity in swapping using the swap device.

According to various embodiments, the processor may be configured to, based on attributes of each of a plurality of data stored in the memory, classify the plurality of the data into a plurality of groups, and determine a swap device corresponding to each of the plurality of the groups.

According to various embodiments, the processor may be configured to determine at least some data included in each of the plurality of the groups as a swapping target, based on data usage history information corresponding to each of the plurality of the groups, and swap the determined at least some data using a swap device corresponding to each of the plurality of groups.

According to various embodiments, the processor may be configured to generate association information between the attributes of the data and attributes of the at least one swap device, and determine a swap device for swapping the data among the swap devices, based on the association information.

According to various embodiments, the association information may include information which sets at least one of swap device performance, a swap device lifespan, access availability to the swap device, or data integrity in swapping using the swap device among the attributes of the at least one swap device, based on at least one of whether the data is related to a user interface, an execution frequency of the data, erasability of the data, a memory range accessed per unit time in execution of the data, or integrity of the data in swapping among the attributes of the data.

According to various embodiments, the processor may be configured to determine a swap device for swapping the data among the swap devices, based on state information of each of the swap devices, and the state information of each of the swap devices may include at least one of a swap device available space, a swap device free space, a data amount stored in the swap device, or a connection state of the swap device.

According to various embodiments, the processor may be configured to change a swap device for swapping the data among the swap devices, based on a swapping overhead value of each of the swap devices with respect to the data.

According to various embodiments, the processor may be configured to change a swap device for swapping the data among the swap devices, based on a system performance improvement value according to securing a memory space for each of the swap devices and a swapping overhead value of each of the swap devices.

Figure 3:
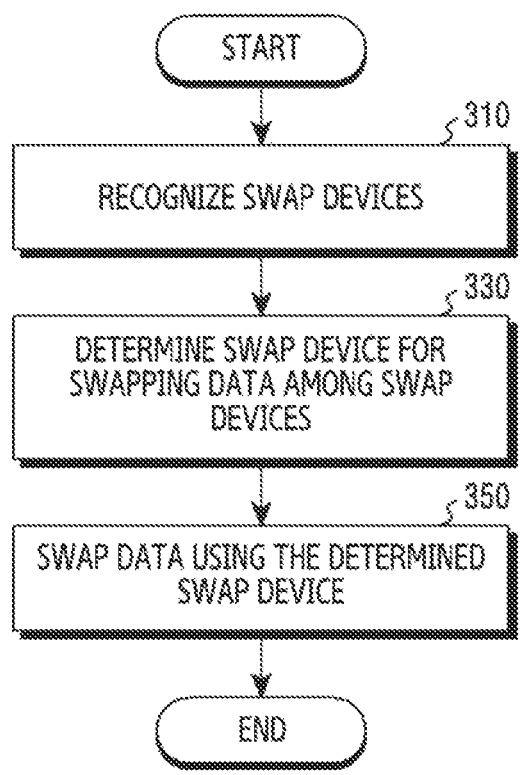
FIG. 3 is a diagram for explaining a data swapping method using a plurality of swap devices according to an embodiment of the present disclosure.

FIG. 3 is a diagram for explaining a data swapping method using a plurality of swap devices according to an embodiment of the present disclosure.

Referring to FIG. 3, in operation 310, a processor (e.g., the processor 230 of FIG. 2) of an electronic device (e.g., the electronic device 200 of FIG. 2) may recognize a plurality of swap devices (e.g., the swap devices 210 of FIG. 2). For example, the processor may recognize a swap device in which a part of a storage space of a storage medium embedded in the electronic device or connected from outside is set as the swap space. The plurality of the swap devices (e.g., the swap devices 210 of FIG. 2) may indicate a plurality of swap spaces. For example, the swap devices (e.g., the swap devices 210 of FIG. 2) may use at least a part of the swap device as the swap space, and may use the whole swap device as the swap space.

According to an embodiment, the processor may statically or dynamically recognize the plurality of the swap devices. For example, the processor may recognize (statically recognize) at least one of the plurality of the swap devices in system booting of the electronic device. As another example, the processor may recognize (dynamically recognize) at least one of the plurality of the swap devices if a storage medium providing the swap space is newly connected to the electronic device or if the system requests at a designated time.

According to an embodiment, the processor may set attributes (e.g., hardware attributes) of each of the plurality of the recognized swap devices. The attributes of each of the plurality of the swap devices may include, for example, at least one of performance, lifespan, access availability, or data integrity.

According to an embodiment, the processor may determine attributes of data used by an executed process or an application program. Herein, the data may include at least one page of pages related to the process. For example, in the following description, data to swap may include a page of the process, and the attributes of the data may include the attributes of the process. The attributes of the data may include, for example, at least one of whether the UI is related, an execution frequency, erasability, a memory range accessed per unit time, or data integrity.

In operation 330, the processor may determine a swap device for swapping the data among the plurality of the swap devices. According to an embodiment, the processor may determine the swap device for swapping the data among the plurality of the swap devices, based on the attributes of the data and the attributes of each of the plurality of the swap devices. For example, if the data is data related to the UI, the processor may determine a swap device having high performance as the swap device for swapping the data. As another example, if the data is data having a high execution frequency, the processor may determine a swap device having high performance as the swap device for swapping the data. As yet another example, if the data is optionally erasable data, the processor may determine a swap device having high access availability and a long lifespan as the swap device for swapping the data. As still another example, if the data is data having a wide memory range, the processor may determine a swap device having high performance and a long lifespan as the swap device for swapping the data. As a further example, if the data is data requiring the data integrity, the processor may determine a swap device which ensures the data integrity as the swap device for swapping the data.

According to an embodiment, the processor may determine a swap device for swapping the data, based on association information between the attributes of the data and the attributes of the swap device. The association information may indicate, for example, information of the swap device attribute to consider according to the attribute of the data. For example, whether the UI is related of the attributes of the data may be associated with the performance of the attributes of the swap device. As another example, the execution frequency of the attributes of the data may be associated with the performance of the attributes of the swap device. As yet another example, the erasability of the attributes of the data may be associated with the access availability and the lifespan of the attributes of the swap device. As still another example, the memory range of the attributes of the data may be associated with the performance and the lifespan of the attributes of the swap device. As a further example, the data integrity may be associated with the integrity of the attributes of the swap device.

In the above description, the method of determining the swap device for each data attribute has been described, but the processor may determine the swap device based on at least one of the attributes of the data. For example, the processor may determine the swap device for swapping the data based on at least one of whether the UI is related, the execution frequency, the erasability, the memory range accessed per unit time, or the data integrity among the attributes of the data. Also, in the above description, the method of determining the swap device for swapping the data based on the data attributes and the swap device attributes has been described, where determining the swap device may indicate mapping the data with the determined swap device.

In operation 350, the processor may swap the data using the determined swap device. If determining (or mapping) the swap device for swapping the data and selecting the data as the swap target, the processor may swap the data using the determined (or mapped) swap device. For example, the processor may move (or swap out) the data stored in a memory (e.g., the memory 250 of FIG. 2) to the determined (or mapped) swap device. Also, if re-executing the data, the processor may move (or swap in) the data temporarily stored in the determined (or mapped) swap device to the memory.

According to an embodiment, the processor may determine the data to swap in data stored in the memory based on usage history information of the data. For example, the processor may determine, as the swapping target, data having a low execution frequency (or the number of uses) or the oldest last execution (or use) among the data stored in the memory. For example, the processor may determine a page to swap among pages stored in the memory, based on a page LRU list.

Figure 4:
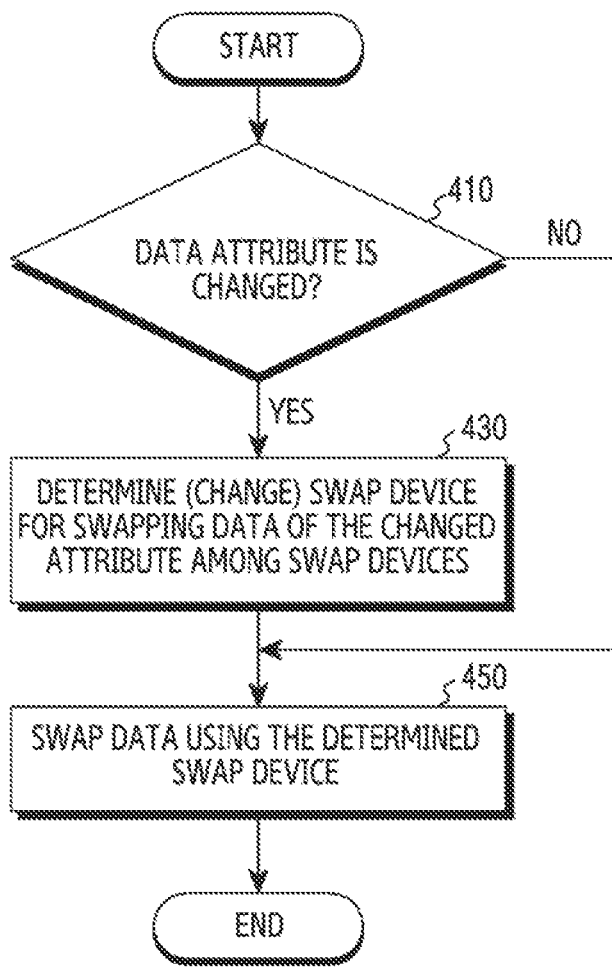
FIG. 4 is a diagram for explaining a method of determining a swap device according to a data attribute change according to an embodiment of the present disclosure.

FIG. 4 is a diagram for explaining a method of determining a swap device according to a data attribute change according to an embodiment of the present disclosure.

Referring to FIG. 4, in operation 410, a processor (e.g., the processor 230 of FIG. 2) of an electronic device (e.g., the electronic device 200 of FIG. 2) may determine whether a data attribute used by an executed process or application program is changed. For example, the processor may determine whether at least one of whether the UI is related, an execution frequency, erasability, a memory range accessed per unit time, and data integrity of the data attributes is changed. The attribute of the data may be changed by the system during the runtime or may be changed by user setting.

If it is determined that no attribute of the data is changed (operation 410—"NO"), the processor may swap data using a swap device previously determined to swap the data, in operation 450.

If it is determined that the attribute of the data is changed (operation 410—"YES"), the processor may determine (change) a swap device for swapping the data of the changed attribute among a plurality of swap devices (e.g., the swap devices 210 of FIG. 2), in operation 430. For example, the processor may determine the swap device for swapping the data of the changed attribute among the plurality of the swap devices, based on the attribute of the data of the changed attribute and attributes of each of the plurality of the swap devices in a similar manner to operation 330 of FIG. 3. If the first swap device is determined as the swap device for swapping the data before the attribute of the data is changed, and the second swap device is newly determined because the attribute of the data is changed, the processor may change the swap device for swapping the data of the changed attribute from the first swap device to the second swap device.

If determining (changing) the swap device for swapping the data of the changed attribute, the processor may swap the data of the changed attribute using the determined (changed) swap device, in operation 450.

Figure 5:
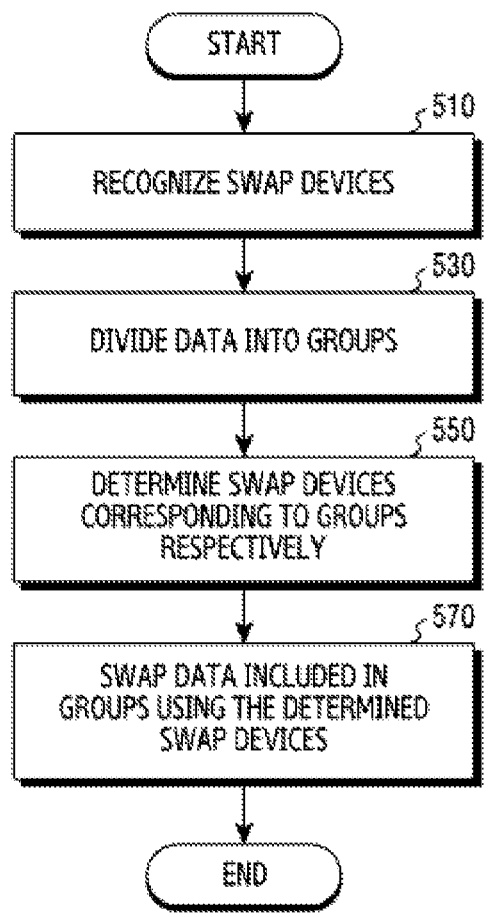
FIG. 5 is a diagram for explaining another data swapping method using a plurality of swap devices according to an embodiment of the present disclosure.

FIG. 5 is a diagram for explaining another data swapping method using a plurality of swap devices according to an embodiment of the present disclosure.

Referring to FIG. 5, in operation 510, a processor (e.g., the processor 230 of FIG. 2) of an electronic device (e.g., the electronic device 200 of FIG. 2) may recognize a plurality of swap devices (e.g., the swap devices 210 of FIG. 2). For example, the processor may recognize a swap device in which a part of a storage space of a storage medium embedded in the electronic device or connected from outside is set as the swap space.

According to an embodiment, the processor may statically or dynamically recognize the plurality of the swap devices. For example, the processor may recognize (statically recognize) at least one of the plurality of the swap devices during system booting of the electronic device. As another example, the processor may recognize (dynamically recognize) at least one of the plurality of the swap devices if the storage medium providing the swap space is newly connected to the electronic device or if the system requests at a designated time.

According to an embodiment, the processor may set attributes (e.g., hardware attributes) for each of the plurality of the recognized swap devices. The attributes of each of the plurality of the swap devices may include, for example, at least one of the performance, the lifespan, the access availability, or the data integrity.

According to an embodiment, the processor may determine attributes of data used by an executed process or application program. Herein, the data may include at least one page of pages related to the process. For example, in the following description, data to swap may include a page of the process, and the attribute of the data may include the attributes of the process. The attributes of the data may include, for example, at least one of whether the UI is related, the execution frequency, the erasability, the memory range accessed per unit time, or the data integrity.

In operation 530, the processor may divide (or classify) a plurality of data into a plurality of groups (or classes). According to an embodiment, the processor may divide (or classify) the plurality of the data into the plurality of the groups according to attributes of each of the plurality of data. For example, the processor may classify data having the same or similar attributes into one group. For example, the processor may classify pages of the same process into one group. As another example, the processor may classify pages of processes having the same or similar attributes into one group. If the plurality of the data is classified into the plurality of the groups according to the attribute of each of the plurality of the data, the plurality of the groups each may have a representative attribute. For example, the processor may set attributes of each of the plurality of the groups based on the attributes of the data included in the plurality of the groups. Alternatively, the processor may set attributes of each of the plurality of the groups, and classify the plurality of the data according to the set attributes of each of the groups. In this regard, the attributes of each of the plurality of the groups may include the same type as the attributes of the data. For example, the attributes of each of the plurality of the groups may include at least one of whether the UI is related, the execution frequency, the erasability, the memory range accessed per unit time, or the data integrity with respect to the data included in each of the plurality of the groups.

According to an embodiment, the processor may generate a designated number of groups at a system start time, for example, at a turn-on time of the electronic device. In another embodiment, the processor may further generate a new group at an arbitrary time during the runtime or change at least one attribute of the generated groups.

According to an embodiment, the processor may classify the generated data into the groups, at the data generation. In some embodiment, the processor may change (or reassign) the data to other group, according to an execution state of the data during the runtime.

In operation 550, the processor may determine swap devices corresponding to the plurality of the groups respectively. For example, the processor may determine a swap device for swapping data included in each of the plurality of the groups among the plurality of the swap devices. According to an embodiment, the processor may determine a swap device for swapping data included in the group among the plurality of the swap devices, based on the group attributes and the attributes of each of the plurality of the swap devices. For example, if the group attributes include an attribute related to the UI, the processor may determine a swap device having high performance as the swap device for swapping the data included in the group. As another example, if the group attributes include a high execution frequency attribute, the processor may determine a swap device having high performance as the swap device for swapping the data included in the group. As yet another example, if the group attributes include the optional erasability attribute, the processor may determine a swap device having high access availability and a long lifespan as the swap device for swapping the data included in the group. As still another example, if the group attributes include a wide memory range attribute, the processor may determine a swap device having high performance and a long lifespan as the swap device for swapping the data included in the group. As a further example, if the group attributes include the data integrity attribute, the processor may determine a swap device ensuring data integrity as the swap device for swapping the data included in the group.

According to an embodiment, the processor may determine a swap device for swapping data included in the group, based on association information between the attributes of the group and the attributes of the swap device. The association information may indicate, for example, information of the swap device attribute to consider according to the group attribute. For example, whether the UI is related of the group attributes may be associated with the performance of the swap device attributes. As another example, the execution frequency of the group attributes may be associated with the performance of the swap device attributes. As yet another example, the optional erasability of the group attributes may be associated with the access availability and the lifespan of the swap device attributes. As still another example, the memory range of the group attributes may be associated with the performance and the lifespan of the swap device attributes. As a further example, the integrity of the group attributes may be associated with the integrity of the swap device attributes.

In the above description, the method of determining the swap device for each attribute of the group has been described, but the processor may determine the swap device based on at least one of the group attributes. For example, the processor may determine the swap device for swapping the data included in the group based on at least one of whether the UI is related, the execution frequency, the erasability, the memory range accessed per unit time, or the data integrity of the group attributes. In addition, the above description has explained the method of determining the swap device for swapping the data included in the group based on the group attributes and the swap device attributes, wherein determining the swap device may indicate mapping the determined swap devices to the plurality of the groups respectively.

In operation 570, the processor may swap data included in the plurality of the groups using the determined swap devices. If determining (or mapping) the swap device corresponding to the group and selecting data included in the group as the swapping target, the processor may swap the data included in the group using the determined (or mapped) swap device. For example, the processor may move (or swap out) the data included in the group stored in the memory (e.g., the memory 250 of FIG. 2) to the determined (or mapped) swap device. Also, if re-executing data included in the group, the processor may move (or swap in) the data temporarily stored in the determined (or mapped) swap device to the memory.

According to an embodiment, the processor may determine data to swap among the data stored in the memory based on usage history information of the data included in the group. For example, the processor may determine, as the swapping target, data having a low execution frequency (or the number of uses) or the oldest last execution (or use) among the data stored in the memory. For example, the processor may determine a page to swap among pages stored in the memory, based on a page LRU list. According to an embodiment, if a plurality of data (or process pages) is classified into a plurality of groups, the processor may determine data to swap based on data use history information (e.g., the page LRU list) corresponding to each of the plurality of the groups.

Figure 6:
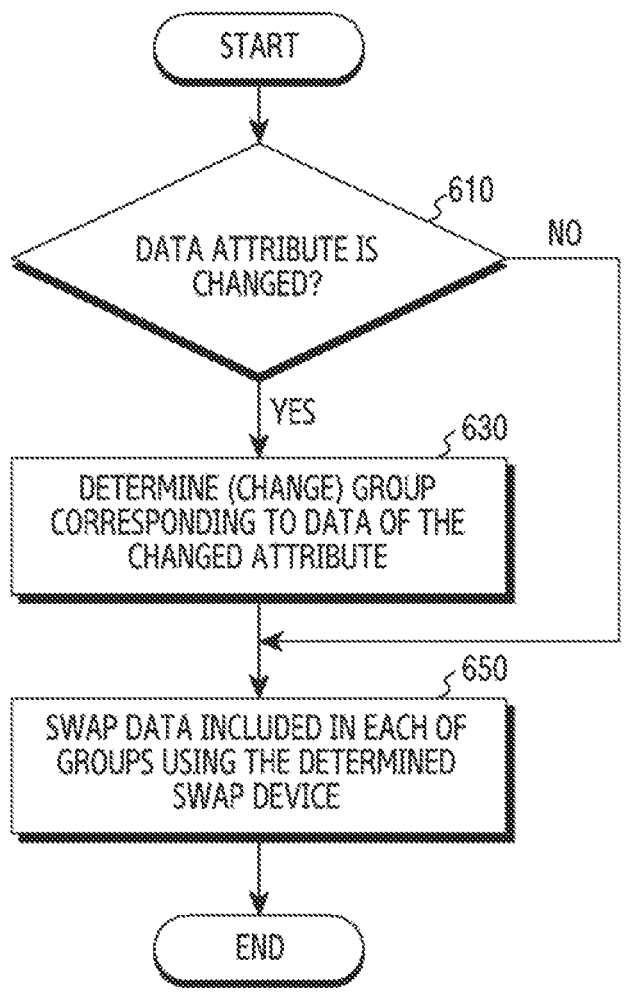
FIG. 6 is a diagram for explaining another method of determining a swap device according to a data attribute change according to an embodiment of the present disclosure.

FIG. 6 is a diagram for explaining another method of determining a swap device according to a data attribute change according to an embodiment of the present disclosure.

Referring to FIG. 6, in operation 610, a processor (e.g., the processor 230 of FIG. 2) of an electronic device (e.g., the electronic device 200 of FIG. 2) may determine whether an attribute of data used by an executed process or application program is changed. For example, the processor may determine whether at least one of whether the UI is related, the execution frequency, the erasability, the memory range accessed per unit time, or the data integrity of the data attributes is changed. The data attribute may be changed by the system during the runtime or may be changed by user setting.

If it determined that no data attribute is changed (operation 610—"NO"), the processor may swap data included in a plurality of groups by using the determined swap devices respectively, in operation 650. For example, the data may be swapped using the swap device corresponding to the group including the data.

If it is determined that the data attribute is changed (operation 620—"YES"), the processor may determine (change) a group corresponding to the data of the changed attribute, in operation 630. For example, similarly to operation 530 of FIG. 5, the processor may determine the group corresponding to the data of the changed attribute to the attributes of the data of the changed attribute. If the data is included in the first group before the attribute of the data is changed and the second group is newly determined because the data attribute is changed, the processor may change the data of the changed attribute from the first group to the second group.

If determining (changing) the group corresponding to the data of the changed attribute, the processor may swap the data of the changed attribute by using the swap device corresponding to the determined (changed) group, in operation 650.

Figure 7:
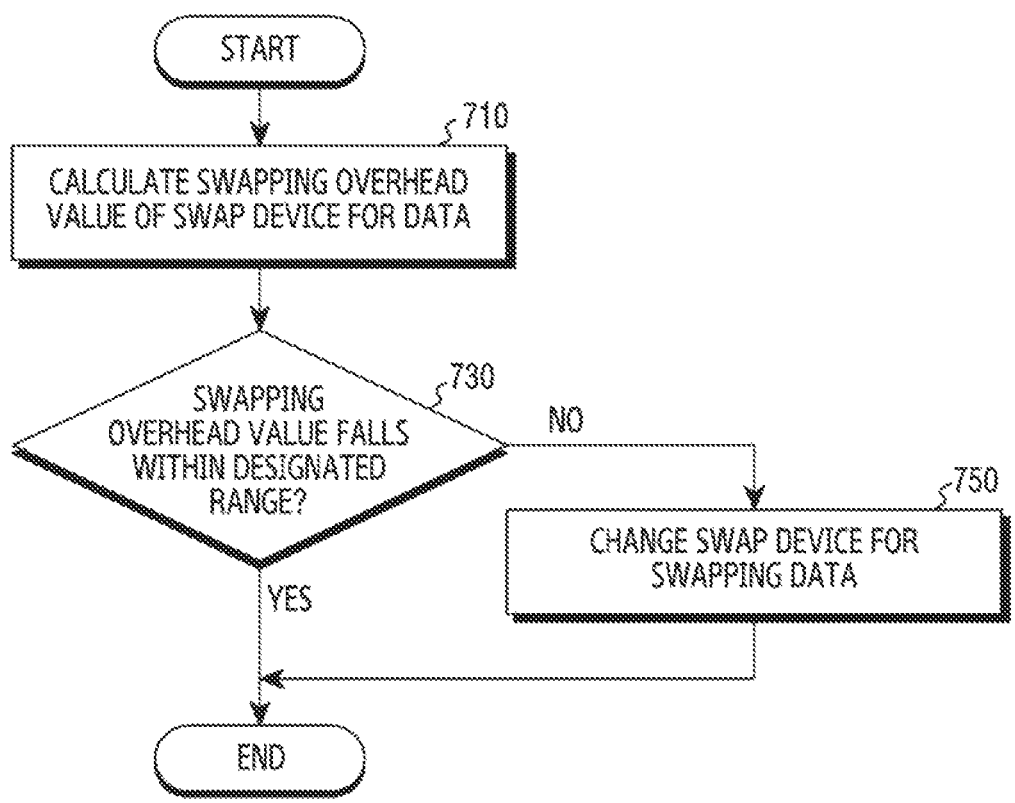
FIG. 7 is a diagram for explaining a method of changing a swap device to improve data swapping performance according to an embodiment of the present disclosure.

FIG. 7 is a diagram for explaining a method of changing a swap device to improve data swapping performance according to an embodiment of the present disclosure.

Referring to FIG. 7, in operation 710, a processor (e.g., the processor 230 of FIG. 2) of an electronic device (e.g., the electronic device 200 of FIG. 2) may calculate a swapping overhead value of a swap device (e.g., the swap device 210 of FIG. 2) with respect to data used by an executed process or application program. The swapping overhead value is a numerical value of load processing of the swap device in swapping data (or data included in a group) using the swap device, a lower swapping overhead value indicates less swapping load, and a higher overhead value indicates greater swapping load. The swapping overhead value may be calculated by Equation 1 described above. According to an embodiment, the processor may calculate the swapping overhead value at designated intervals during the runtime.

In operation 730, the processor may determine whether the swapping overhead value falls within a designated range. The designated range may indicate a range from a subtraction value to an addition value of a designated margin value based on a system average value.

If the swapping overhead value falls within the designated range (operation 730—"YES"), the process of changing the swap device for improving the data swapping performance described in FIG. 7 may be terminated. For example, the processor may maintain the swap device for swapping the data (or data included in the group) without changing it.

If the swapping overhead value does not fall within the designated range (operation 730—"NO"), the processor may change (or redetermine) the swap device for swapping the data (or data included in the group), in operation 750. According to an embodiment, if the swapping overhead value is greater than the system average value by the margin value or more (exceeds a maximum value of the designated range), the processor may change (or upgrade) the swap device for swapping the data to a swap device having the low swapping overhead value. In another embodiment, if the swapping overhead value is smaller than the system average value by the margin value or more (falls below a minimum value of the designated range), the processor may change (or downgrade) the swap device for swapping the data or data included in the group) to a swap device having the high swapping overhead value FIG. 8 is a diagram for explaining a method of determining a swap device to optimize system performance according to an embodiment of the present disclosure.

Figure 8:
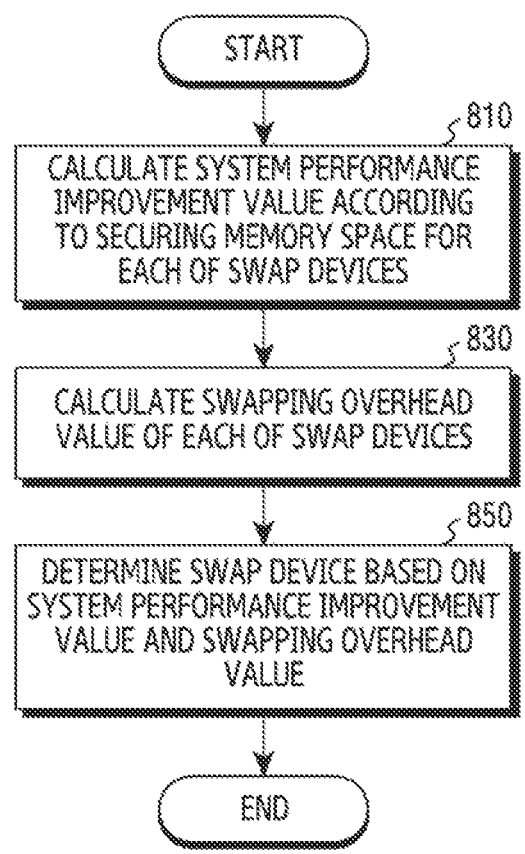
FIG. 8 is a diagram for explaining a method of determining a swap device to optimize system performance according to an embodiment of the present disclosure.

Referring to FIG. 8, in operation 810, a processor (e.g., the processor 230 of FIG. 2) of an electronic device (e.g., the electronic device 200 of FIG. 2) may calculate a system performance improvement value according to securing a memory space for each of a plurality of swap devices (e.g., the swap devices 210 of FIG. 2). The system performance improvement value is a numerical value of system performance improvement with a memory space which may be secured by swapping data (or data included in a group) used by a running process or application program, a higher performance improvement value indicates system performance improvement, and a lower system performance improvement value indicates system performance degradation. The system performance improvement value may be calculated by the following Equation 2. The system performance improvement value may be calculated by Equation 2 described above. According to an embodiment, the processor may calculate the system performance improvement value at designated intervals during a runtime.

In operation 830, the processor may calculate a swapping overhead value of each of the plurality of the swap devices. The swapping overhead value is a numerical value of processing load of the swap device in swapping the data (or data included in the group) using the swap device, a lower swapping overhead value indicates less swapping load and a higher overhead value indicates greater swapping load. The swapping overhead value may be calculated by Equation 1 described above. According to an embodiment, the processor may calculate the swapping overhead value at designated intervals during the runtime. According to an embodiment, operation 810 described above may be performed after operation 830 described above.

In operation 850, the processor may determine (or change) the swap device for swapping the data (or data included in the group) based on the system performance improvement value and the swapping overhead value. According to an embodiment, the processor may determine a swap device having the greatest value ($e_{gain} - e_{loss}$) obtained by subtracting the swapping overhead value ($e_{loss}$ calculated by Equation 1) calculated for each of the plurality of the swap devices from the system performance improvement value ($e_{gain}$ calculated by Equation 2 below) calculated for each of the plurality of the swap devices as the swap device for swapping the data (or data included in the group). If the swap device for swapping the data (or data included in the group) is determined as the first swap device, and the second swap device is newly determined based on the system performance improvement value and the swapping overhead value, the processor may change the swap device for swapping the data (or data included in the group) from the first swap device to the second swap device.

As described above, according to various embodiments, a data swapping method for an electronic device (e.g., the electronic device 101 or the electronic device 200) may include determining (e.g., operation 330) a swap device for swapping data among swap devices, based on attributes of the data to swap stored in a memory (e.g., the memory 130 or the memory 250) of the electronic device and attributes of at least one swap device among the plurality of the swap devices included in the electronic device, and swapping (e.g., operation 250) the data using the determined swap device.

According to various embodiments, the attributes of the data may include at least one of whether the data is related to a user interface, an execution frequency of the data, erasability of the data, a memory range accessed per unit time in execution of the data, or integrity of the data in swapping.

According to various embodiments, the attributes of the at least one swap device may include at least one of a swap device performance, a swap device lifespan, access availability to the swap device, or data integrity in swapping using the swap device.

According to various embodiments, the data swapping method may further include classifying (e.g., operation 530) a plurality of data into a plurality of groups, based on attributes of each of the plurality of the data stored in the memory, and determining (e.g., operation 550) a swap device corresponding to each of the plurality of the groups.

According to various embodiments, the data swapping method may further include determining, as a swapping target, at least some data of data included in each of the plurality of the groups, based on data usage history information corresponding to each of the plurality of the groups, and swapping the determined at least some data using the swap device corresponding to each of the plurality of the groups.

According to various embodiments, the data swapping method may further include generating association information between the attributes of the data and the attributes of the at least one swap device, and determining the swap device may include determining a swap device for swapping the data from among the swap devices, based on the association information.

According to various embodiments, generating the association information may include setting information of at least one of swap device performance, a swap device lifespan, access availability to the swap device, or data integrity in swapping using the swap device among the attributes of the at least one swap device, based on at least one of whether the data is related to a user interface, an execution frequency of the data, erasability of the data, a memory range accessed per unit time in execution of the data, or integrity of the data in swapping among the attributes of the data.

According to various embodiments, determining the swap device may include determining a swap device for swapping the data among the swap devices, based on state information of each of the swap devices, and the state information of each of the swap devices may include at least one of a swap device available space, a swap device free space, a data stored in the swap device, or a connection state of the swap device.

According to various embodiments, the data swapping method may further include changing (e.g., operation 750) a swap device for swapping the data among the swap devices, based on a swapping overhead value of each of the swap devices with respect to the data.

According to various embodiments, the data swapping method may further include changing (e.g., operation 850) a swap device for swapping the data among the swap devices, based on a system performance improvement value according to securing a memory space for each of the swap devices and a swapping overhead value of each of the swap devices.

Figure 9:
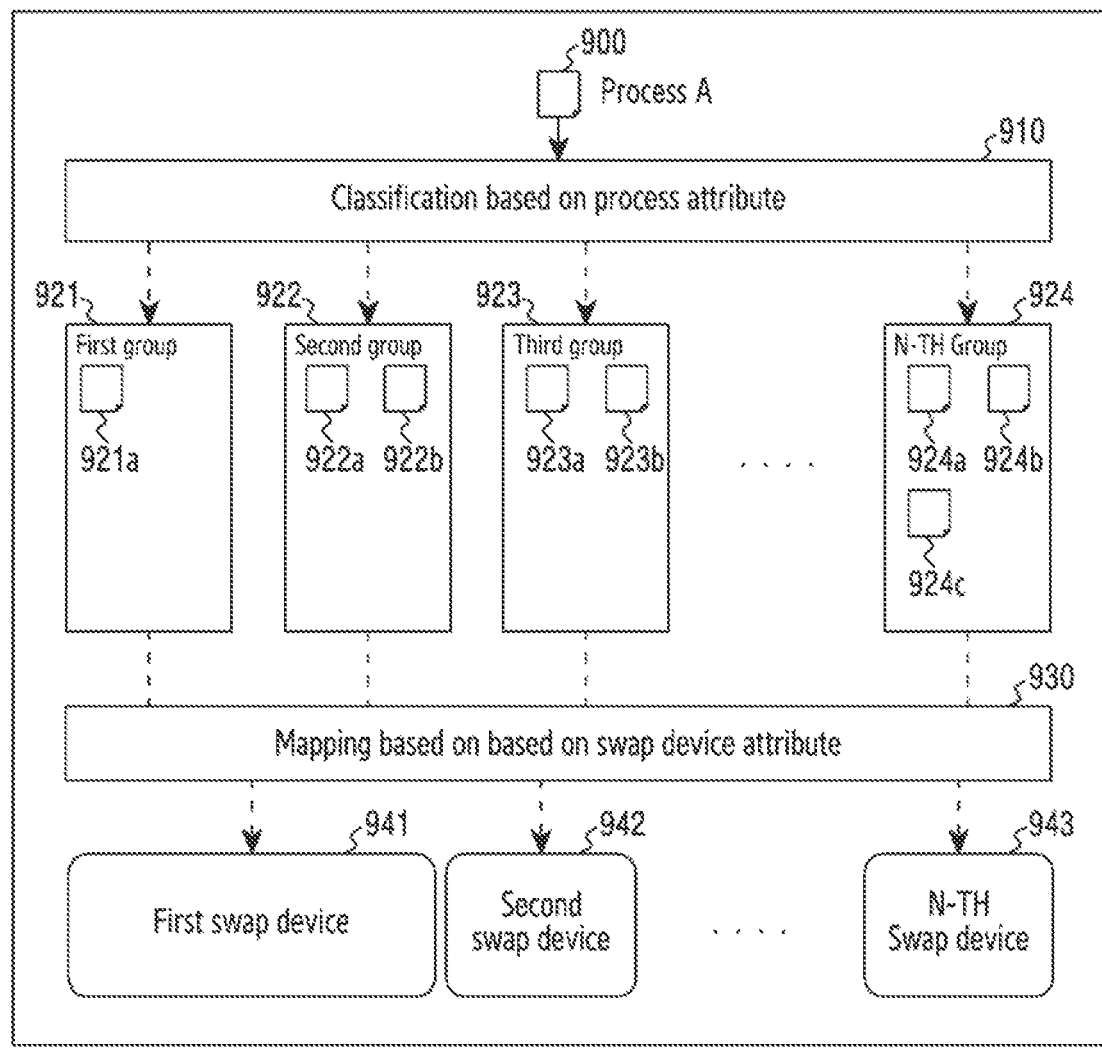
FIG. 9 is a diagram for explaining a method of swapping a page of a process based on process attributes and swap device attributes according to an embodiment of the present disclosure.

FIG. 9 is a diagram for explaining a method of swapping pages of a process based on process attributes and swap device attributes according to an embodiment of the present disclosure. FIG. 9 describes the method of swapping a process executed by a processor (e.g., the processor 230 of FIG. 2) of an electronic device (e.g., the electronic device 200 of FIG. 2).

Referring to FIG. 9, the processor may generate and execute a process 900 (e.g., a process A of FIG. 9) for performing a designated function based on system setting or a user input. The process 900 may refer to a program and data loaded into a main memory device (e.g., the memory 250 of FIG. 2) while the program for performing the designated function is executed.

In operation 910, the processor may perform classification based on attributes of the process 900. For example, the processor may classify the process 900 into one group of a plurality of groups (or classes) based on the attributes of the process 900. According to an embodiment, the processor may compare attributes of each of the plurality of the groups with the attributes of the process 900, and include the process 900 into a group having the same attributes or attribute similarity equal to or greater than a designated size. The attributes of the process 900 may include, for example, at least one of whether the process 900 is related to the UI, an execution frequency of the process 900, whether the system may erase the process 900 if necessary, a memory range accessed during the operation of the process 900, or whether to maintain integrity in swapping the data of the process 900. The attributes of each of the plurality the of groups may include the same type as the attributes of the process 900. For example, the attributes of each of the plurality of the groups may include at least one of whether the process included in each of the plurality of the groups is related to the UI, an execution frequency of the process, whether the system may erase the process if necessary, a memory range accessed during the operation of the process, or whether to maintain integrity in swapping the data of the process FIG. 9 shows that a first group 921, a second group 922, a third group 923, and an n-th group 924 are included as the plurality of the groups. Herein, n may denote 0 or a natural number. For example, the processor may generate (or set) at least one group.

According to an embodiment, by comparing the attributes of the process 900 with the attributes of each of the plurality of the groups, if there is a plurality of groups having the same attribute or the attribute similarity equal to or greater than the designated size, the processor may apply the load balancing. For example, the processor may determine a group to include the process 900, based on the number of processes included in the plurality of the groups. For example, the processor may include (classify) the process 900 into a group having a small number of the included processes among the plurality of the groups.

If the process 900 is classified into any one of the plurality of the groups, the processor may perform mapping according to attributes of the swap device (e.g., the swap device 210 of FIG. 2), in operation 930. For example, the processor may map swap devices corresponding to the plurality of the groups respectively, based on the attributes of each of the plurality of the swap devices. Herein, mapping the swap devices corresponding to the plurality of the groups respectively may indicate determining the swap device for swapping data included in each of the plurality of the groups among the plurality of the swap devices. For example, if the attributes of the group include an attribute related to the UI, the processor may map a swap device having high performance to the group. As another example, if the group attributes include a high execution frequency attribute, the processor may map a swap device having high performance to the group. As yet another example, if the group attribute includes an optional erasability attribute, the processor may map a swap device having high access availability and a long lifespan to the group. As still another example, if the group attributes include a wide memory range attribute, the processor may map a swap device having high performance and a long lifespan to the group. As a further example, if the group attribute includes an integrity attribute, the processor may map a swap device ensuring the data integrity to the group.

According to an embodiment, the processor may map the group and the swap device, based on association information between the group attributes and the swap device attributes. The association information may indicate, for example, information of the swap device attribute to consider according to the attribute of the group. For example, whether the UI is related of the data attributes (or the group attributes) may be associated with the performance of the attributes of the swap device. As another example, the execution frequency of the data attributes (or the group attributes) may be associated with the performance of the swap device attributes. As yet another example, the optional erasability of the data attributes (or the group attributes) may be associated with the access availability and the lifespan of the swap device attributes. As still another example, the memory range of the data attributes (or the group attributes) may be associated with the performance and the lifespan of the swap device attributes. As a further example, the integrity of the data attributes (or the group attributes) may be associated with the integrity of the swap device attributes.

As above, the method of mapping the swap device for each attribute of the group has been described, but the processor may map the group and the swap device based on at least one of the group attributes. For example, the processor may map the group and the swap device based on at least one of whether the UI is related, the execution frequency, the erasability, the memory range accessed per unit time, or the data integrity among the group attributes.

FIG. 9 illustrates that a first swap device 941, a second swap device 942 and an n-th swap device 943 are included as the plurality of the swap devices. Herein, n may denote 0 or a natural number. For example, the electronic device may include at least one swap device.

According to an embodiment, based on the attributes of the group and the attributes of each of the plurality of the swap devices, if identifying two or more swap devices for swapping data (e.g., a page) of the process 900 included in the group among the plurality of the swap devices, the processor may apply the load balancing. For example, if identifying the first swap device 941 and the second swap device 942 among the plurality of the swap devices, the processor may select any one of the identified first swap device 941 and second swap device 942, based on at least one of a currently available space or free space, or a data amount currently stored (or the number of the pages of the process) of each of the identified first swap device 941 and second swap device 942. For example, the processor may select a swap device storing relatively less pages among the identified first swap device 941 and second swap device 942.

According to an embodiment, the processor may map the swap devices corresponding to the groups respectively based on a current state of each of the swap devices. For example, if any one swap device (e.g., the first swap device 941) has insufficient available space or free space, the great number of the stored pages, or the disconnection, the processor may exclude it from the swap devices mapped to the groups respectively. In this case, the processor may map other swap device (e.g., the second swap device 942) to each of the groups. For example, even if the first swap device 941 is the most suitable swap device for swapping the page of the process included in the group among the plurality of the swap devices based on the group attributes and the swap device attributes, the processor may the second swap device 942 of the plurality of the swap devices instead of the first swap device 941 as the swap device for swapping the page of the process included in the group by considering the current state of the first swap device 941.

Figure 10:
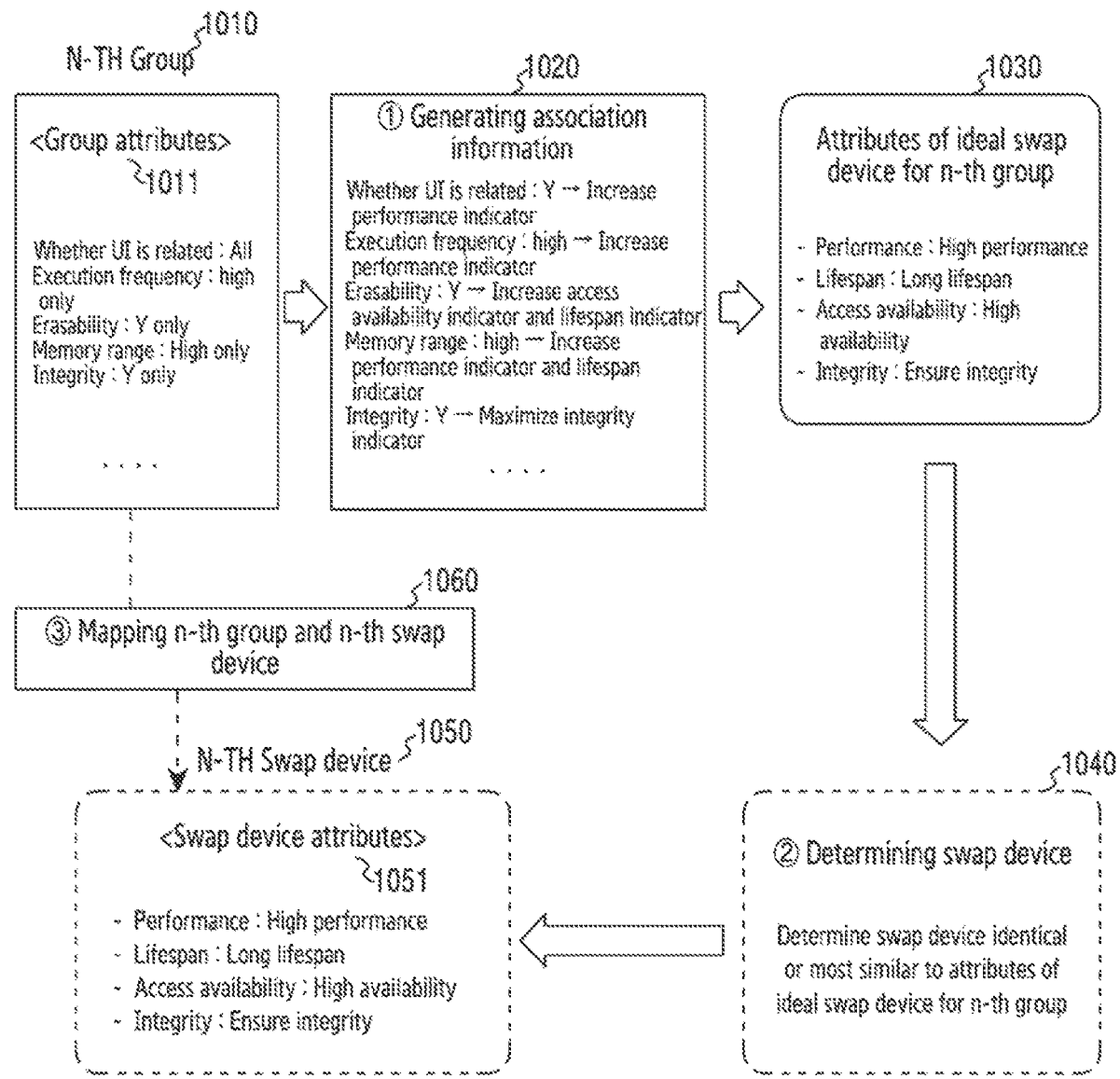
FIG. 10 is a diagram for explaining a mapping method of a swap device for each process group according to an embodiment of the present disclosure.

FIG. 10 is a diagram for explaining a mapping method of a swap device for each process group according to an embodiment of the present disclosure.

Referring to FIG. 10, a processor (e.g., the processor 230 of FIG. 2) of an electronic device (e.g., the electronic device 200 of FIG. 2) may classify a running process (e.g., the process 900 of FIG. 9) into one of a plurality of groups. The processor may generate a designated number of groups at the system start, for example, at the electronic device turn-on, and may further generate a new group at an arbitrary time during a runtime or change at least one attribute of the generated groups. The processor may set attributes of each of the plurality of the groups. FIG. 10 shows that the processor sets attributes 1011 of an n-th group 1010. Herein, n may denote a natural number.

The attributes 1011 of the n-th group 1010 may include at least one of whether the process included in the n-th group 1010 is related to the UI, an execution frequency of the process, and whether the system may optionally erase the process, a memory range accessed during the operation of the process, or integrity in swapping data of the process. Whether the UI is related may indicate whether the process is related to a UI processing operation. The UI processing may include, for example, generating and outputting (or displaying) the UI, or processing a user input on the UI. The execution frequency may indicate an execution frequency of the process. The erasability may indicate whether the system may erase the process if necessary. For example, the erasability may indicate whether a specific process, which is forcibly terminated during its execution, does not affect other process execution or the system. The memory range may indicate a memory range accessed by the process during its actual operation. The data integrity may indicate whether to maintain data integrity if swapping data (e.g., a page) of the process. For example, the data integrity may be determined according to whether consistency is maintained (whether the integrity is ensured) between data (e.g., swap out data) moved from the memory (e.g., the memory 250 of FIG. 2) to the swap device and data (e.g., swap in data) moved from the swap device to the memory, if the data is swapped using the swap device.

As in operation 1020, the processor may generate association information between the process attributes and the swap device. The association information may indicate, for example, swap device attribute information to consider according to the attribute of the process (or an attribute of a group). For example, whether the UI is related of the process attributes (or the group attributes) may be associated with the performance of the swap device attributes. As another example, the execution frequency of the process attributes (or the group attributes) may be associated with the performance the swap device attributes. As yet another example, the optional erasability of the process attributes (or the group attribute) may be associated with the access availability and the lifespan of the swap device attributes. As still another example, the memory range of the process attributes (or the group attributes) may be associated with the performance and the lifespan of the swap device attributes. As a further example, the integrity of the process attributes (or the group attributes) may be associated with the integrity of the swap device attributes.

For example, if whether the UI is related of the process attributes (or the group attributes) corresponds to a value "Y" (the process is related to the UI), the processor may increase a performance indicator of the swap device attributes. As another example, if the execution frequency of the process attributes (or the group attributes) corresponds to a value "high" (the execution frequency of the process exceeds a designated value), the processor may increase the performance indicator of the swap device attributes. As yet another example, if the optional erasability of the process attributes (or the group attributes) corresponds to a value "Y" (the process erasure does not affect other process), the processor may increase an access availability indicator and a lifespan indicator of the swap device attributes. As still another example, if the memory range of the process attributes (or the group attributes) corresponds to a value "high" (the memory range accessed by the process during its actual operation is greater than or equal to a designated size), the processor may increase the performance indicator and lifespan indicator of the swap device attributes. As a further example, if the integrity of the process attributes (or the group attributes) corresponds to a value of "Y" (the data swapping should ensure the data integrity), the processor may increase an integrity indicator to maximum among the swap device attributes.

According to an embodiment, as in operation 1030, the processor may determine attributes of an ideal swap device for swapping the data of the process based on the association information. For example, if the performance indicator of the swap device attributes is greater than or equal to a designated value, the processor may determine that the ideal swap device has the high performance (high performance) attribute. As another example, if the lifespan indicator of the swap device attributes is equal to or greater than a designated value, the processor may determine that the ideal swap device has a long lifespan attribute. As yet another example, if the access availability indicator of the swap device attributes is greater than or equal to a designated value, the processor may determine that the ideal swap device has a high access availability attribute. As still another example, if the integrity indicator of the swap device attributes is the maximum value, the processor may determine that the ideal swap device has the data integrity attribute.

According to an embodiment, as in operation 1040, the processor may determine a swap device having the same attribute as the attribute of the ideal swap device among the plurality of the swap devices as the swap device for swapping the data of the process. In some embodiment, if the plurality of the swap devices includes no swap device having the same attribute as the attribute of the ideal swap device, the processor may determine a swap device having the most similar attribute to the attribute of the ideal swap device among the plurality of the swap devices as the swap device for swapping the data of the process. FIG. 10 illustrates that the processor determines an n-th swap device 1050. For example, attributes 1051 of the n-th swap device 1050 may be identical to the attributes of the ideal swap device or most similar attributes among the plurality of the swap devices.

If determining the swap device (e.g., the n-th swap device 1050) for swapping the data of the process, as in operation 1060, the processor may map the n-th group 1010 and the determined n-th swap device 1050.

Figure 11A:
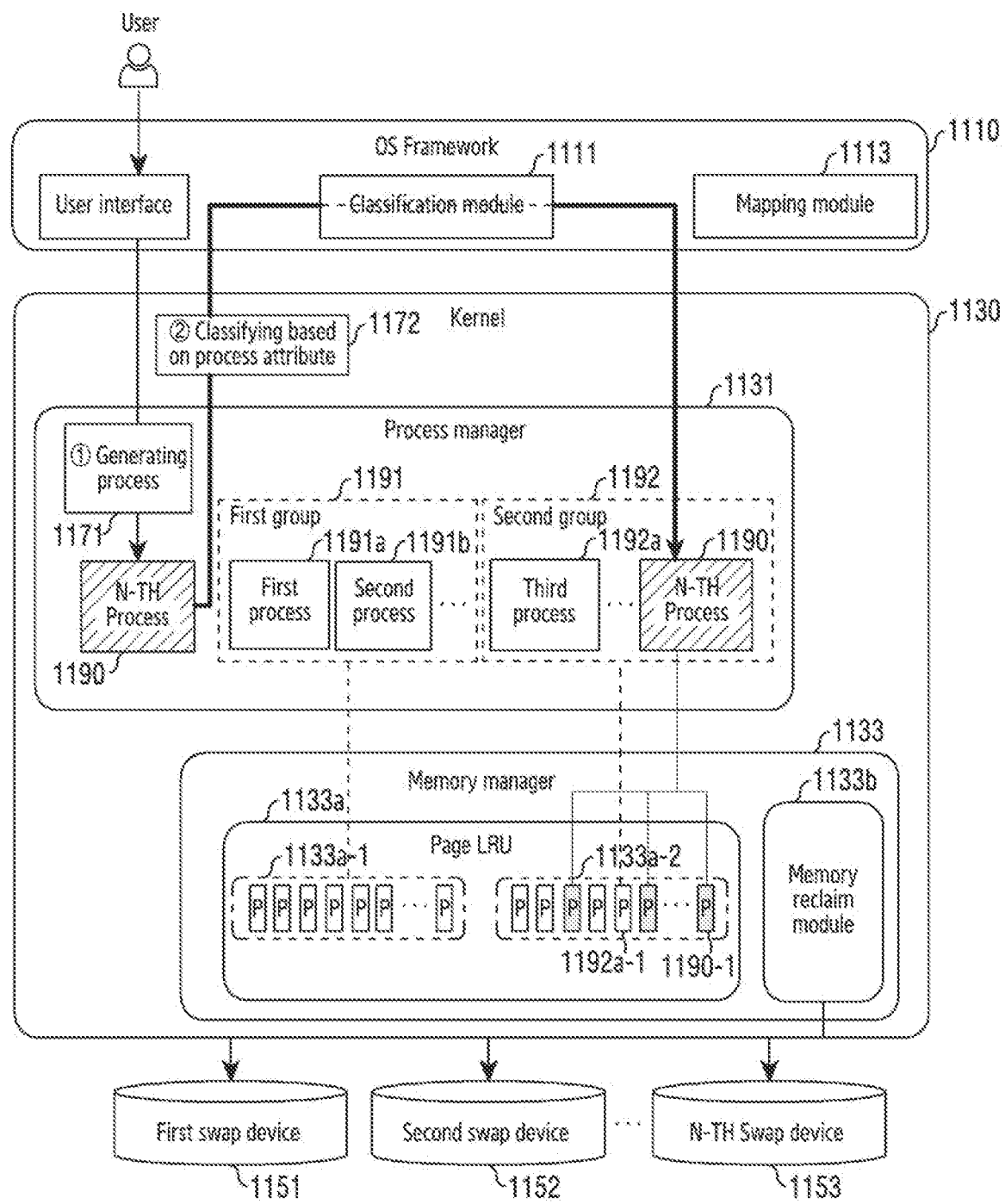
FIG. 11A is a diagram for explaining a group classification method according to process attributes according to an embodiment of the present disclosure.
Figure 11B:
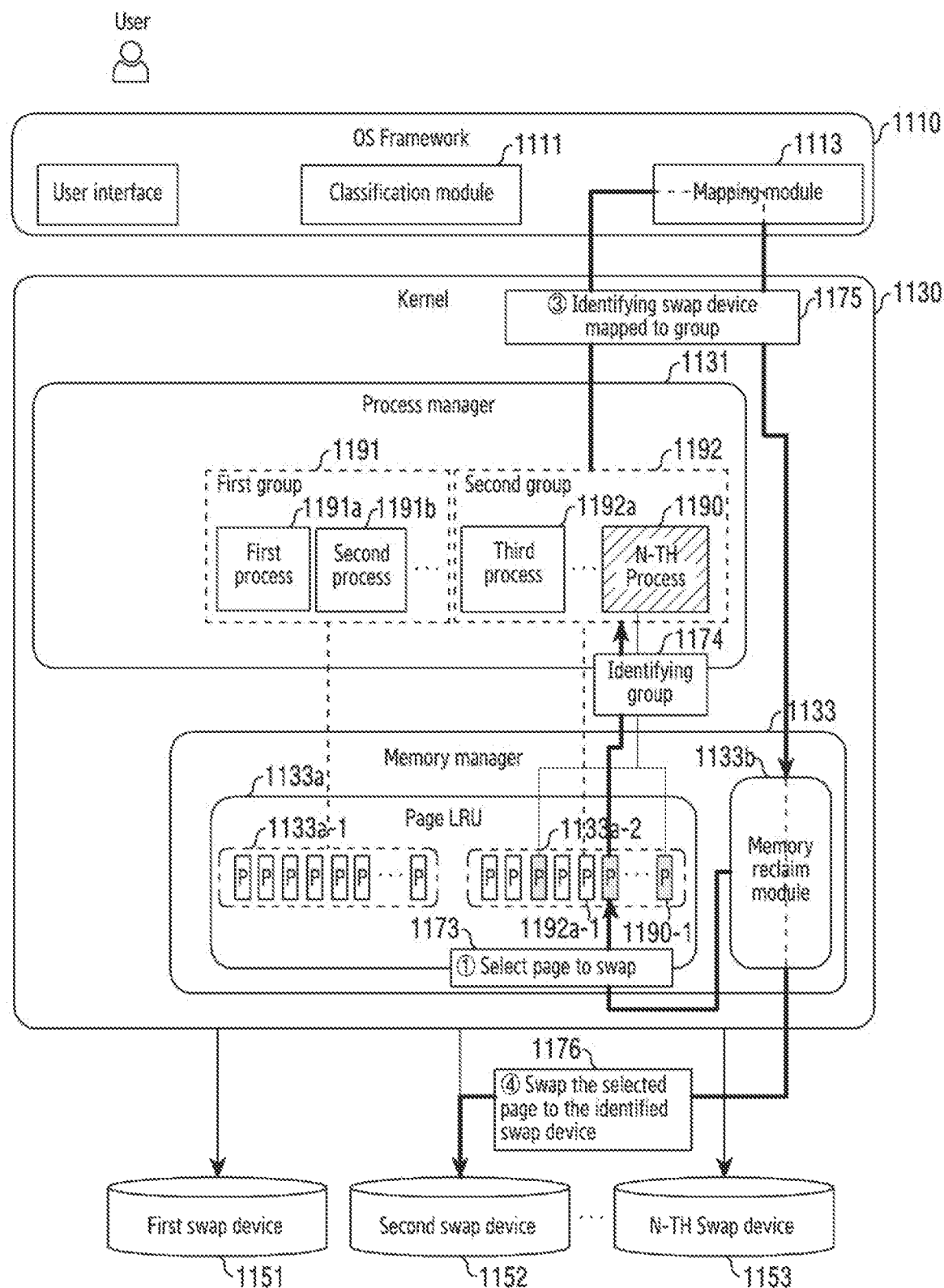
FIG. 11B is a diagram for explaining a swapping method using a swap device mapped for each process group according to an embodiment of the present disclosure.

FIG. 11A is a diagram for explaining a group classification method according to process attributes according to an embodiment of the present disclosure, and FIG. 11B is a diagram for explaining a swapping method using a swap device mapped for each process group according to an embodiment of the present disclosure.

Referring to FIG. 11A and FIG. 11B, swapping a process executed by a processor (e.g., the processor 230 of FIG. 2) of an electronic device (e.g., the electronic device 200 of FIG. 2) may be implemented through a program module executed by the processor. The program module may include, for example, an operating system (OS) framework 1110 and a kernel 1130.

If receiving an input from the user through the UI, the OS framework 1110 may forward information related to the received input to a process manager 1131 included in the kernel 1130. The process manager 1131 may generate a process based on the received information, in operation 1171. For example, the process manager 1131 may generate an n-th process 1190 distinguished from pre-generated processes (e.g., a first process 1191a, a second process 1191b, or a third process 1192a).

If a new process (e.g., the n-th process 1190) is generated, the kernel 1130 may request the OS framework 1110 to classify according to attributes of the generated process, as in operation 1172. The OS framework 1110 receiving the request may classify the generated process, that is, the n-th process 1190, according to its attributes through a classification module 1111. For example, the classification module 1111 may classify the n-th process 1190 into one group of groups (or classes) based on the attributes of the n-th process 1190. According to an embodiment, the classification module 1111 may compare attributes of each of the groups with the attributes of the n-th process 1190, and include the n-th process 1190 into a group having the same attribute or an attribute similarity equal to or greater than a designated size. The attributes of the n-th process 1190 may include, for example, at least one of whether the n-th process 1190 is related to the UI, an execution frequency of the n-th process 1190, whether the system may erase the n-th process 1190 if necessary, a memory range accessed during an operation of the n-th process 1190, or integrity if data of the n-th process 1190 is swapped. The attributes of each of the plurality of the groups may include the same type as the attributes of the n-th process 1190. For example, the attributes of each of the plurality of the groups may include at least one of whether the process included in each of the plurality of the groups is related to the UI, the execution frequency of the process, whether the process is optionally erasable in the system, the memory range accessed during the operation of the process, or the integrity if the data of the process is swapped.

FIG. 11A and FIG. 11B illustrate that a first group 1191 and a second group 1192 are included as the plurality of the groups, and the n-th process 1190 is classified into the second group 1192, but it is not limited thereto. For example, the plurality of the groups may further include at least one other third group than the first group 1191 and the second group 1192, and in this case, the n-th process 1190 may be also classified into the at least one other third group than the second group 1192.

The processes classified by the classification module 1111 (e.g., the first process 1191a, the second process 1191b, the third process 1192a and the n-th process 1190) and the plurality of the groups (e.g., the first group 1191 and the second group 1192) including at least one process may be managed by the process manager 1131.

If the processes are classified into the groups by the classification module 1111, the OS framework 1110 may map swap devices for swapping pages of the process included in each of the plurality of the groups through the mapping module 1113. According to an embodiment, the mapping module 1113 may map each of the plurality of the groups to any one of the plurality of the swap devices, based on the attributes of each of the plurality of the groups and attributes of the plurality of the swap devices (e.g., a first swap device 1151, a second swap device 1152 or an n-th swap device 1153). Herein, mapping the corresponding swap devices to the plurality of the groups respectively may indicate determining the swap device for swapping the pages of the process included in each of the plurality of the groups among the plurality of the swap devices. For example, if the group attributes include the UI related attribute, the mapping module 1113 may map a swap device having high performance to the group. As another example, if the group attributes include a high execution frequency attribute, the mapping module 1113 may map a swap device having high performance to the group. As yet another example, if the group attributes include the optional erasability attributes, the mapping module 1113 may map a swap device having high access availability and a long lifespan to the group. As still another example, if the group attributes include a wide memory range attribute, the mapping module 1113 may map a swap device having high performance and a long lifespan to the group. As a further example, if the group attributes include the integrity attribute, the mapping module 1113 may map a swap device ensuring integrity of the process pages to the group.

According to an embodiment, the mapping module 1113 may map the group and the swap device, based on association information between the attributes of the group and the attributes of the swap device. The association information may indicate, for example, swap device attribute information to consider according to the attributes of the group. For example, whether the UI is related of the group attributes may be associated with the performance of the swap device attributes. As another example, the execution frequency of the group attributes may be associated with the performance of the swap device attributes. As yet another example, the optional erasability of the group attributes may be associated with the access availability and the lifespan of the swap device attributes. As still another example, the memory range of the group attributes may be associated with the performance and the lifespan of the swap device attributes. As a further example, the integrity of the group attributes may be associated with the integrity of the swap device attributes.

In the above description, the method of mapping the swap device based on the group attribute has been described, but the mapping module 1113 may map the group and the swap device based on at least one of the group attributes. For example, the mapping module 1113 may map the group and the swap device based on at least one of whether the UI is related, the execution frequency, the erasability, the memory range accessed per unit time, or the data integrity of the group attributes.

At least one of the plurality of the swap devices (e.g., the first swap device 1151, the second swap device 1152 and the n-th swap device 1153) may indicate a virtual device which sets as the swap space a part of a storage space of a storage medium embedded in the electronic device or connected and recognized from outside. Alternatively, at least one of the plurality of the swap devices may indicate the storage medium embedded in the electronic device or connected and recognized from the outside. FIG. 11A and FIG. 11B illustrate that the first swap device 1151, the second swap device 1152 and the n-th swap device 1153 are included as the plurality of the swap devices. Herein, n may denote 0 or a natural number.

After the swap device corresponding to each of the plurality of the groups is mapped, if swapping is required (e.g., insufficient storage space of the memory), the memory manager 1133 included in the kernel 1130 may select (or determine) a swapping target, that is, a page to swap, through a memory claim module 1133b, in operation 1173. According to an embodiment, the memory reclaim module 1133b may select (or determine) the page to swap from pages stored in the memory, based on a page LRU list 1133a. For example, the memory reclaim module 1133b may select (or determine), as the swapping target, at least one page having a low execution frequency (or the number of uses) or having the oldest last execution (or use) among the pages stored in the memory.

According to an embodiment, the page LRU list 1133a may include a page LRU list corresponding to each of the plurality of the groups. For example, as shown in FIG. 11A and FIG. 11B, the page LRU list 1133a may include a first page LRU list 1133a-1 corresponding to the first group 1191 and a second page LRU list 1133a-2 corresponding to the second group 1192. In this case, the memory reclaim module 1133b may determine the process page to swap based on the page LRU list corresponding to each of the plurality of the groups. For example, as shown in FIG. 11B, the memory reclaim module 1133b may select (or determine) at least one of pages 1192a-1 of the third process 1192a and the pages 1190-1 of the n-th process 1190 included in the second page LRU list 1133a-2 as the swapping target.

If the page to swap is selected (or determined), the mapping module 1113 may determine a group to which the page to swap belongs, in operation 1174. For example, the mapping module 1113 may determine the group including the process of the page to swap. FIG. 11B illustrates that the page 1190-1 of the n-th process 1190 is selected (or determined) as the page to swap, and the mapping module 1113 determines the process of the page 1190-1, that is, the second group 1192 including the n-th process 1190.

If the group is determined, the mapping module 1113 may determine a swap device mapped to the group in operation 1175. For example, the mapping module 1113 may determine the swap device mapped to the group among the plurality of the swap devices. FIG. 11B illustrates that the mapping module 1113 determines the second swap device 1152 mapped to the second group 1192.

If the swap device mapped to the group is determined, the memory reclaim module 1133b may swap (e.g., swap out) the selected (or determined) page to the determined swap device, in operation 1176. According to an embodiment, if swapping out the page (e.g., the page 1190-1) of the process (e.g., the n-th process 1190), the memory reclaim module 1133b may record information of the swap device (e.g., the second swap device 1152) which swaps out the page in a page table of the process. In addition, if an access (or use) request for the swapped-out page occurs and the page is swapped in to the memory, the swap device information recorded in the page table may be identified, and the page may be swapped in from the swap device which swaps out into the memory.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a plurality of swap devices;
   at least one processor; and
   memory storing instructions and data to swap, wherein the instructions, when executed by the at least one processor individually or collectively, cause the electronic device to:
      based on data attributes of each of a plurality of data stored in the memory, classify the plurality of data into groups, the data attributes comprising a first data attribute of first data of the plurality of data,
      among the plurality of swap devices, identify swap devices corresponding to the groups based on the data attributes,
      determine whether the first data attribute is changed during runtime of an executed process or an application program which uses the first data,
      in response to determination that the first data attribute is changed, based on the changed first data attribute of the first data and device attributes of the plurality of swap devices, identify a first group among the groups comprising the first data,
      identify a swap device corresponding to the first group, having a device attribute corresponding to the changed first data attribute, from the plurality of swap devices, and
      swap the first data from the memory to the identified swap device,
   wherein the changed first data attribute is at least one of: whether the first data is related to a user interface, or erasability of the first data.

2. The electronic device of claim 1, wherein the device attributes of the plurality of swap devices comprise at least one of swap device performance, swap device lifespan, access availability to the plurality of swap devices, or data integrity in swapping using the plurality of swap devices.

3. The electronic device of claim 1, wherein the instructions, when executed by the at least one processor individually or collectively, cause the electronic device to execute the instructions individually or collectively to:
   identify at least a portion of data in each of the groups as a swapping target, based on data usage history information corresponding to each of the groups; and
   swap the identified at least the portion of the data using a swap device among the plurality of swap devices corresponding to each of the groups.

4. The electronic device of claim 1, wherein the instructions, when executed by the at least one processor individually or collectively, cause the electronic device to execute the instructions individually or collectively to:
   generate association information between the first data attribute and the device attributes of the plurality of swap devices, and
   identify the swap device for swapping the first data, based on the association information.

5. The electronic device of claim 4, wherein the association information comprises information which sets at least one of the device attributes including swap device performance, swap device lifespan, access availability to the plurality of swap devices, or data integrity in swapping using the plurality of swap devices to correspond to at least one data attribute among the data attributes comprising whether data is related to the user interface, the erasability of data, a memory range accessed per unit time in execution of data, or the integrity of data in swapping.

6. The electronic device of claim 1, wherein the instructions, when executed by the at least one processor individually or collectively, cause the electronic device to execute the instructions individually or collectively to identify the swap device for swapping the first data among the plurality of swap devices, further based on state information of each of the plurality of swap devices, and
wherein the state information of each of the plurality of swap devices comprises at least one of a swap device available space, a swap device free space, a data amount stored in the swap device, or a connection state of the swap device.

7. The electronic device of claim 1, wherein the instructions, when executed by the at least one processor individually or collectively, cause the electronic device to execute the instructions individually or collectively to change the swap device for swapping the first data, based on a swapping overhead value of each of the plurality of swap devices with respect to the first data.

8. The electronic device of claim 1, wherein the instructions, when executed by the at least one processor individually or collectively, cause the electronic device to execute the instructions individually or collectively to change the swap device for swapping the first data, based on a system performance improvement value according to securing a memory space for each of the plurality of swap devices and a swapping overhead value of each of the plurality of swap devices.

9. A data swapping method for an electronic device, the data swapping method comprising:
based on data attributes of each of a plurality of data stored in memory, classifying the plurality of data into groups, the data attributes comprising a first data attribute of first data of the plurality of data;
among a plurality of swap devices in the electronic device, identifying swap devices corresponding to the groups based on the data attributes;
determining whether the first data attribute is changed during runtime of an executed process or an application program which uses the first data;
in response to determination that the first data attribute is changed, based on the changed first data attribute of the first data and device attributes of the plurality of swap devices, identifying a first group among the groups comprising the first data,
identifying a swap device corresponding to the first group, having a device attribute corresponding to the changed first data attribute, among the plurality of swap devices; and
swapping the first data from the memory to the identified swap device,
wherein the changed first data attribute is at least one of: whether the first data is related to a user interface, or erasability of the first data.

10. The data swapping method of claim 9, further comprising:
generating association information between the first data attribute of the data and the device attributes of the plurality of swap devices,
wherein the identifying the swap device comprises:
identifying the swap device for swapping the first data from the plurality of swap devices, based on the association information.

11. The data swapping method of claim 10, wherein the generating the association information comprises setting information of performance of the plurality of swap devices, swap device lifespan, access availability to the plurality of swap devices, or data integrity in swapping using the plurality of swap devices to correspond to at least one data attribute among the data attributes comprising whether data is related to the user interface, the erasability of data, a memory range accessed per unit time in execution of data, or the integrity of data in swapping.

12. The data swapping method of claim 9, further comprising:
changing the swap device for swapping the first data, based on a swapping overhead value of each of the plurality of swap devices with respect to the first data.

13. The data swapping method of claim 9, further comprising:
changing the swap device for swapping the first data, based on a system performance improvement value according to securing a memory space for each of the plurality of swap devices and a swapping overhead value of each of the plurality of swap devices.

14. The data swapping method of claim 9, wherein the device attributes of the plurality of swap devices comprise at least one of a swap device performance, a swap device lifespan, access availability to the swap device, or data integrity in swapping using the swap device.

15. The data swapping method of claim 9, further comprising:
identifying, as a swapping target, at least a portion of data in each of the groups, based on data usage history information corresponding to each of the groups; and
swapping the identified at least the portion of data using the swap device corresponding to each of the groups.

16. The data swapping method of claim 9,
wherein the identifying the swap device comprises identifying the swap device for swapping the first data among the plurality of swap devices, further based on state information of each of the plurality of swap devices, and
wherein the state information of each of the plurality of swap devices comprises at least one of a swap device available space, a swap device free space, a data amount stored in the swap device, or a connection state of the swap device.

* * * * *